United States Patent [19]
Yamasaki et al.

[11] Patent Number: 5,849,194
[45] Date of Patent: Dec. 15, 1998

[54] APPARATUS AND METHOD FOR TREATING WASTE WATER BOTH CHEMICALLY AND BIOLOGICALLY UTILIZING REACTION FILLERS

[75] Inventors: Kazuyuki Yamasaki, Hiroshima; Atsushi Yokotani, Fukuyama; Kazuyuki Sakata, Fukuyama; Hiroshi Makino, Fukuyama; Masanori Sanada, Kasaoka, all of Japan

[73] Assignee: Sharp Kabushiki Kaisha, Osaka, Japan

[21] Appl. No.: 762,915

[22] Filed: Dec. 10, 1996

[30] Foreign Application Priority Data

Dec. 28, 1995 [JP] Japan .................................. 7-342602

[51] Int. Cl.⁶ .............................. C02F 1/58; C02F 3/06
[52] U.S. Cl. ..................... 210/614; 210/617; 210/618; 210/631; 210/663
[58] Field of Search ..................... 210/143, 150, 210/151, 195.1, 195.3, 202, 220, 258, 259, 614, 616, 617, 618, 626, 631, 663

[56] References Cited

U.S. PATENT DOCUMENTS

| | | | |
|---|---|---|---|
| 4,322,296 | 3/1982 | Fan et al. .................................. | 210/618 |
| 4,566,971 | 1/1986 | Reimann et al. ......................... | 210/151 |
| 4,800,021 | 1/1989 | Desbos .................................... | 210/150 |
| 5,019,268 | 5/1991 | Rogalla .................................... | 210/151 |
| 5,304,308 | 4/1994 | Tsumura et al. .......................... | 210/614 |
| 5,462,666 | 10/1995 | Kimmel .................................. | 210/151 |
| 5,480,537 | 1/1996 | Yamasaki et al. ....................... | 210/151 |
| 5,580,458 | 12/1996 | Yamasaki et al. ....................... | 210/617 |

FOREIGN PATENT DOCUMENTS

| | | |
|---|---|---|
| 54-107153 | 8/1979 | Japan . |
| 5-253576 | 10/1993 | Japan . |
| 5-254829 | 10/1993 | Japan . |
| 6091258 | 4/1994 | Japan . |

OTHER PUBLICATIONS

Translution of Japanese Kokai 54–107153.
U.S. Application No. 08/897,454, filed Jul. 22, 1997, "Method and Apparatus for Wastewater Treatment by Chemical Reaction of Reactive Filler and Propagated Microorganisms".

*Primary Examiner*—Christopher Upton
*Attorney, Agent, or Firm*—Nixon & Vanderhye P.C.

[57] ABSTRACT

The waste water treatment apparatus includes a first water tank which has an upper part and a lower part. The upper part has an air diffuser, and calcium carbonate mineral is packed in the upper part. The calcium carbonate mineral in the upper part is strongly fluidized by aeration by the air diffuser to treat waste water in the upper part through its chemical reaction with the waste water. The calcium carbonate mineral settles in the lower part and serves as an immobilizing carrier for microorganisms to execute microbial treatment of the water.

3 Claims, 18 Drawing Sheets

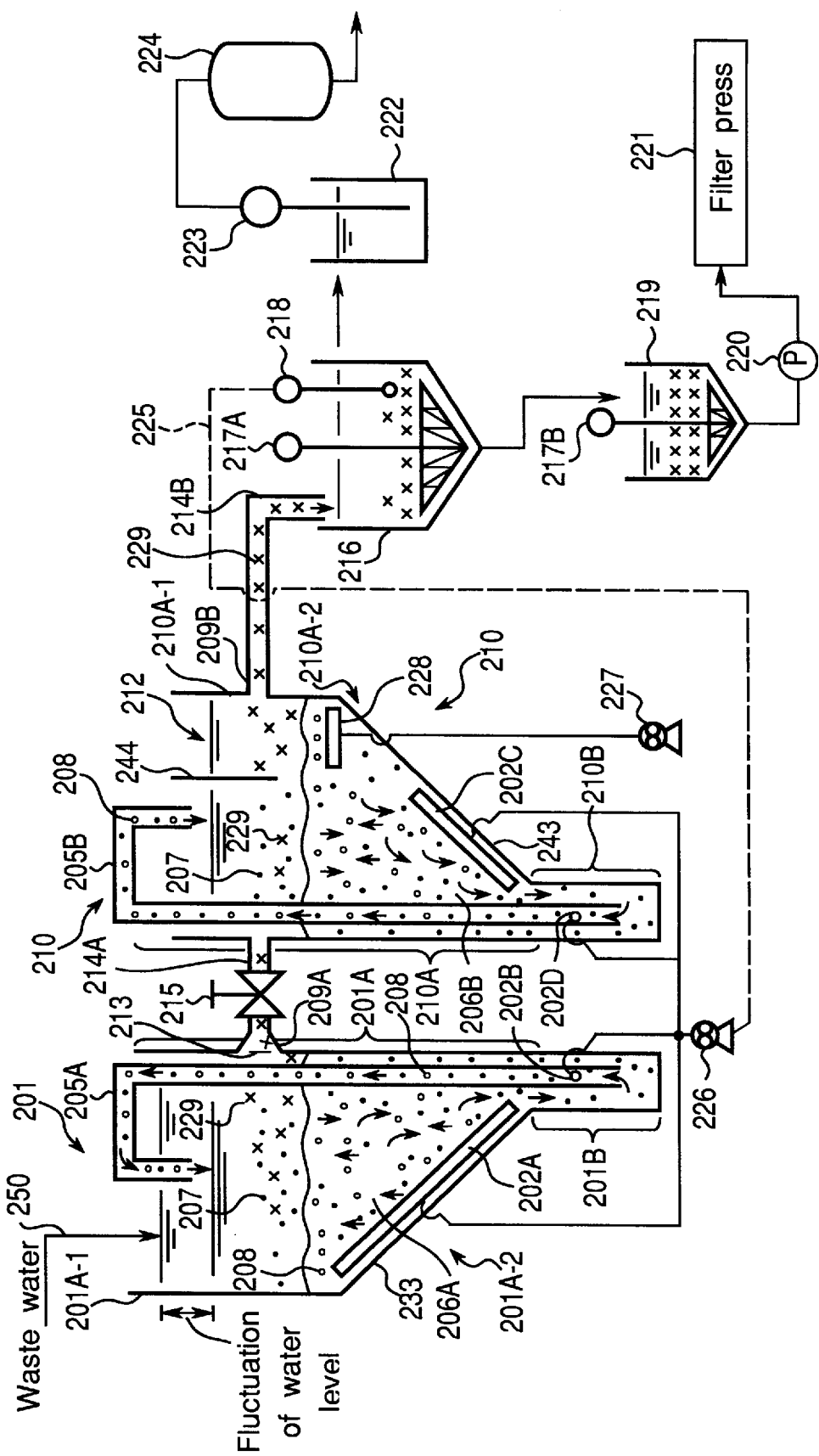

Fig. 11

| Name of tank | Residence time | Number of times of in-tank circulation | Timing (Residence time) 1hr. 2hr. 3hr. 4hr. 5hr. 6hr. 7hr. 8hr. 9hr. 10hr. 11hr. |
|---|---|---|---|
| (1) For normal fluorine concentration | | | |
| Air lift pump | 10 sec. | | 10 sec. |
| Upper part of first water tank | 1 hr. | 1 cycle/hr. | 1 hr. |
| Lower part of first water tank | 1 hr. | 1 cycle/hr. | 1 hr. |
| Microbial sludge agitation part | 30 min. | | 30 min. |
| Second water tank (settling tank) | 3 hr. | | 3 hr. |
| Third water tank (concentrating tank) | 5 hr. | | 5 hr. |
| (2) For higher fluorine concentration | | | |
| Air lift pump | 5 sec. | | 5 sec. |
| Upper part of first water tank | 0.5 hr. | 2 cycle/hr. | 0.5 hr. |
| Lower part of first water tank | 0.5 hr. | 2 cycle/hr. | 0.5 hr. |
| Microbial sludge agitation part | 30 min. | | 30 min. |
| Second water tank (settling tank) | 3 hr. | | 3 hr. |
| Third water tank (concentrating tank) | 5 hr. | | 5 hr. |

Fig. 12

| Name of tank | Residence time | Number of times of in-tank circulation | Timing (Residence time) 1hr. 2hr. 3hr. 4hr. 5hr. 6hr. 7hr. 8hr. 9hr. 10hr. 11hr. |
|---|---|---|---|
| (1) For normal hydrogen peroxide concentration | | | |
| Air lift pump | 10 sec. | | 10 sec. |
| Upper part of first water tank | 1 hr. | 1 cycle/hr. | 1 hr. |
| Lower part of first water tank | 1 hr. | 1 cycle/hr. | 1 hr. |
| Microbial sludge agitation part | 30 min. | | 30 min. |
| Second water tank (settling tank) | 3 hr. | | 3 hr. |
| Third water tank (concentrating tank) | 5 hr. | | 5 hr. |
| (2) For higher hydrogen peroxide concentration | | | |
| Air lift pump | 5 sec. | | 5 sec. |
| Upper part of first water tank | 0.5 hr. | 2 cycle/hr. | 0.5 hr. |
| Lower part of first water tank | 0.5 hr. | 2 cycle/hr. | 0.5 hr. |
| Microbial sludge agitation part | 30 min. | | 30 min. |
| Second water tank (settling tank) | 3 hr. | | 3 hr. |
| Third water tank (concentrating tank) | 5 hr. | | 5 hr. | ized with a small number of tanks.

APPARATUS AND METHOD FOR TREATING WASTE WATER BOTH CHEMICALLY AND BIOLOGICALLY UTILIZING REACTION FILLERS

RELATED APPLICATIONS

This application is related to copending commonly assigned application Ser. No. 08/897,454, filed Jul. 22, 1997 naming Kazuyuki Yamasaki, Atsushi Yokotani, Kazuyuki Sakata, Hiroshi Makino and Masanori Sanada as inventors.

BACKGROUND OF THE INVENTION

The present invention relates to a waste water treatment apparatus and method which can treat waste water discharged from semiconductor factories, liquid crystal factories, or the like and containing fluorine or hydrogen peroxide in addition to organic matters such as surface active agents and organic solvents, efficiently with a small number of tanks.

From the standpoint of the Water Pollution Prevention Law in Japan, when waste water contains not only fluorine but organic matters such as surface active agents and organic solvents as well, it is necessary to treat both the fluorine and the organic matters to specified concentrations.

The organic matters cause the COD (Chemical Oxygen Demand) and the BOD (Biological Oxygen Demand) to increase. Accordingly, the organic matters in waste water, such as surface active agents, although being substances chemically different from fluorine, need to be securely removed.

Organic-matter mixed waste water containing surface active agents and/or organic solvents in addition to fluorine has conventionally been treated through the steps of first chemically treating fluorine with chemicals such as slaked lime, and then treating organic matters such as surface active agents and organic solvents in another tank by a biological process or a physical process such as activated carbon adsorption. In the fluorine treatment using chemicals such as slaked lime, since such chemicals are added in the treatment process, the electrical conductivity of treated water is high. Therefore, the treated water has not been recycled to ultrapure water production devices.

As to the fluorine removal, FIG. 13 shows a known apparatus for this purpose (refer to Japanese Patent Laid-Open Publication No. HEI 5-25357G). This fluorine removal apparatus treats fluorine-containing waste water by passing the water through two calcium carbonate ($CaCO_3$) tanks 533A and 533B. In this fluorine removal apparatus, fluorine-containing waste water is passed through the two calcium carbonate tanks 533A and 533B, and then, the outgoing water is introduced to a circulation tank 542. Then, the water in the circulation tank 542 is introduced to a membrane separation unit 543, where the water is separated into concentrated water and permeated water. The concentrated water contains calcium carbonate crystals flowed out from the second calcium carbonate tank 533B. Further, the concentrated water is returned to the circulation tank 542. Part of the concentrated water is returned to the first calcium carbonate tank 533A.

With this fluorine removal apparatus, fluorine in the waste water is immobilized to and reacts with the calcium carbonate packed in the tanks 533A, 533B, resulting in calcium fluoride. Then, after a specified time elapses, the calcium fluoride is drawn out from the calcium carbonate tanks 533A, 533B.

Another prior art fluorine removal apparatus is a calcium fluoride recovery system which is shown in FIG. 14 and which is basically the same as an apparatus disclosed in Japanese Patent Laid-Open Publication No. HEI 5-254829. In this calcium fluoride recovery system, a calcium carbonate reaction tank 644, which is a tank for reaction with calcium carbonate, comprises vapor piping 647 as a heating equipment, a blower 639 and an air diffuser 602 as aeration equipment. Instead of or in addition to the aeration equipment, the calcium carbonate reaction tank 644 comprises vacuum deaeration equipment (not shown). Reference numeral 635 denotes a raw water tank.

This calcium fluoride recovery system actually adopts a method of recovering calcium fluoride through the steps of adding calcium carbonate supplied from a calcium carbonate silo 645 to fluorine-containing solution, and subjecting the solution to a 50°–100° C. high-temperature process and a high-temperature aeration process and/or a high-temperature vacuum deaeration process.

FIG. 15 shows a conventional waste water treatment system, generally indicated by reference numeral 780, for a semiconductor factory incorporating a fluorine removal apparatus 770. The system 780 is intended to treat organic-matter-containing fluorine waste water generated in a production room 731 of the semiconductor factory.

Generally, in the production room 731 of a semiconductor factory for the manufacture of ICs (Integrated Circuits) or others, an etching unit 737 is installed as shown in FIG. 15. This etching unit 737 uses an etchant composed primarily of hydrogen fluoride or ammonium fluoride.

With the recent progress of ICs toward further microstructure, surface active agents which are organic matters are mixed. into the etchant more often than before. Therefore, the etching unit 737 causes fluorine waste water containing organic matters to flow out to the waste water treatment system 780 through piping 726A.

Also within the production room 731, an organic-solvent employing unit 732 is provided besides the etching unit 737. In this organic-solvent employing unit 732, wafer surfaces are washed with organic solvents and then dried. The organic-solvent employing unit 732 discharges organic-solvent-containing waste water. This organic-solvent-containing waste water is also introduced to and treated in the waste water treatment system 780. That is, organic-solvent-containing waste water discharged by the organic-solvent employing unit 732 also flows through piping 726A into a raw water tank 735.

As seen above, the organic-solvent-containing waste water and the fluorine-containing waste water are combined into organic-matter-containing fluorine waste water, which flows through the piping 726A into the raw water tank 735. Thereafter, the waste water is introduced, as an upward stream, to the fluorine removal unit 770 by a raw water tank pump 736 via piping 726B. In the fluorine removal unit 770, calcium carbonate mineral is packed in a treatment tank 733. As described above, since fluorine in the waste water reacts with calcium carbonate mineral to form calcium fluoride in the treatment tank 733, the fluorine in the waste water can be removed by separating calcium fluoride from the waste water.

The fluorine removal unit 770 can hardly remove organic matters such as surface active agents and organic solvents. The waste water after treated by the fluorine removal unit 770 flows into a settling tank 713 via piping 727. The fluorine concentration of the waste water in this settling tank 713 is detected by a fluorine concentration meter 715. The organic-matter concentration of the waste water in the settling tank 713 is relatively high. Therefore, the waste water is further introduced from the settling tank 713 to a biological treatment unit 740, where organic matters in the waste water, such as surface active agents and organic solvents, are biologically treated.

Meanwhile, acidic waste gas derived from the etching unit 737 is treated by an acid scrubber 734 in FIG. 15. Organic waste gas derived from the organic-solvent employing unit 732 is treated by activated carbon adsorption towers 738A, 738B.

Next explained is a waste water treatment apparatus for treating hydrogen peroxide waste water containing organic matters, such as surface active agents and organic solvents, derived from semiconductor factories, liquid crystal factories, and the like.

When the waste water contains not only hydrogen peroxide but also organic matters such as surface active agents and organic solvents, both the hydrogen peroxide and the organic matters cause the COD (Chemical Oxygen Demand) of the waste water to increase. Therefore, it is necessary to securely remove both hydrogen peroxide and organic matters such as surface active agents and organic solvents in the waste water. conventionally, such organic-matter-containing hydrogen peroxide waste water has been treated through the steps of first treating the hydrogen peroxide with activated carbon or the like used as a catalyst, and thereafter treating the organic matters such as surface active agents and organic solvents in another tank.

FIG. 16 shows a conventional hydrogen peroxide removal unit which is designed to remove hydrogen peroxide in the waste water, using granular activated carbon as a catalyst (refer to Japanese Patent Laid-Open Publication No. HEI 6-91258). This hydrogen peroxide removal unit 870 has, within a treatment tank 833, a contact part 911 partitioned by a bottom-side metal screen 905 and a peripheral wall 906 and opened upward, and a settling part 912 surrounding the contact part 911 with the peripheral wall 906 interposed therebetween. In the lower periphery of the contact part 911 are provided an opening 907 which communicates the settling part 912 with the contact part 911, and a supply port 904 through which the waste water is flowed horizontally into the contact part 911. For operation, granular activated carbon is preparatorily packed in the contact part 911 at a ratio of 1–35% of the tank effective volume.

In this state, hydrogen peroxide-containing waste water is introduced into the treatment tank 833 through piping 807A and then a tank-bottom supply port 903. This hydrogen peroxide-containing waste water penetrates into the contact part 911 through the metal screen 905, filling the contact part 911. Meanwhile, hydrogen peroxide-containing waste water, the flow rate of which can be adjusted by a valve 920, is also introduced into the contact part 911 through a branched piping 807B and then the horizontal supply port 904. As a result, in addition to an upward stream, a volute stream is generated in the contact part 911, so that the granular activated carbon and the hydrogen peroxide-containing waste water make contact with each other. Thus, the hydrogen peroxide is decomposed into water and oxygen by the catalysis of activated carbon. After this treatment, the waste water overflows the contact part 911, entering the settling part 912 and being discharged through piping 827 from a discharge port 918 provided behind a baffle plate 917. In this process, even though granular activated carbon overflows into the settling part 912 along with the treated waste water, the granular activated carbon will settle at the settling part 912 with time, and then return to the contact part 911 through the opening 907. Therefore, only supernatant water is discharged through the discharge port 918 of the settling part 912.

This type of hydrogen peroxide removal unit is, in many cases, incorporated into a waste water treatment system for treating organic-matter-containing hydrogen peroxide waste water generated in a production room of a semiconductor factory. FIG. 17 shows a conventional waste water treatment system 1080 of such type.

Generally, within a production room 1031 of a semiconductor factory where ICs (Integrated Circuits) or the like are manufactured, many apparatuses are provided, such as an RCA cleaning unit 1037 for implementing so-called RCA cleaning, and an organic-solvent employing unit 1032 wherein organic solvents such as acetone and isopropyl alcohol are used. The RCA cleaning is a cleaning process developed by RCA Inc., typically comprising a first step for removing organic matters by using $NH_4OH$, HCl, and $H_2O$, and a second step for removing alkali metals and heavy metals by using HCl, $H_2O_2$, and $H_2O$. With the recent progress of ICs toward further micro-structure, there has been a tendency that surface active agents are mixed into the $NH_4OH$ and HCl. The waste water in which hydrogen peroxide and organic matters such as surface active agents or organic solvents are mixed and which is derived from the RCA cleaning unit 1037 flows through piping 1026A into a raw water tank 1035, where the water quantity and water quality are adjusted to some extent.

Meanwhile, organic-matter-containing waste water derived from the organic-solvent employing unit 1032 also flows into the raw water tank 1035 through the piping 1026A. Accordingly, the waste water containing hydrogen peroxide and the waste water containing organic matters join together at the piping 1026A, resulting in organic-matter-containing hydrogen peroxide waste water as it is present in the raw water tank 1035.

Next, this waste water is introduced to a hydrogen peroxide removal unit 1070 through piping 1026B by a raw water tank pump 1036. In a tank 1033 of the hydrogen peroxide removal unit 1070, hydrogen peroxide in the waste water is decomposed into oxygen and water. However, the hydrogen peroxide removal unit 1070 can hardly remove organic matters such as surface active agents and organic solvents. Thus, the treated waste water is introduced to a treated water tank 1028 through piping 1027. The hydrogen peroxide concentration of the waste water in this treated water tank 1028 is detected by an oxidation-reduction potential meter 1034. If the waste water in the treated water tank 1028 has a high organic-matter concentration, the waste water is further introduced to a biological treatment unit (not shown), where organic matters are treated.

On the other hand, organic-matter-containing waste gas discharged from the RCA cleaning unit 1037 or the organic-solvent employing unit 1032 is treated by a treatment system 1090 for organic-matter-containing waste gas, independently of the treatment system 1080 for organic-matter-containing hydrogen peroxide waste water, as shown in FIG. 17.

As described before, in semiconductor factories for the manufacture of ICs having a micro-structure, there is a tendency that organic matters such as surface active agents and organic solvents are mixed into fluorine waste water. The reason for this is that the more the ICs are advanced for further micro-structure, the more the cleaning technique needs to be improved such that the cleaning effect and/or the etching effect is enhanced by mixing organic matters such as surface active agents into the cleaning chemicals or etching agents, as it is seen nowadays.

Accordingly, there is a need of economically and rationally treating both fluorine waste water and organic-matter-mixed waste water generated in the production room 731 of the semiconductor factory in FIG. 15.

However, as described before, fluorine and organic matters such as surface active agents and organic solvents in the waste water have been treated in different tanks, conventionally. This means that the prior art treatment apparatus requires two treatment units, i.e., a fluorine removal unit and a biological treatment unit for organic-matter treatment. The provision of the two independent treatment tanks has involved a problem of high initial cost.

As shown in FIG. 15, in the production room 731 of the semiconductor factory, many apparatuses are present such as the etching unit 737, the organic-solvent employing unit 732, and other production units. With the recent progress of ICs toward ultra micro-structure, it has been more often the case that organic matters such as surface active agents are mixed into the etchant containing fluorine or that chemicals containing organic solvents are used for cleaning and drying process. Therefore, in the waste water in which these various types of chemicals (fluorine and organic matters such as surface active agents and organic solvents) are mixed, the content of organic matters in the waste water has been increasing with the days.

However, the conventional fluorine removal apparatus as shown in FIG. 13, FIG. 14, or FIG. 15, alone, could hardly treat organic matters such as surface active agents or organic solvents.

This is because the conventional fluorine removal unit has no microorganisms propagating, thus having no biological treatment function, i.e., the unit is operated with no treatment effect on the organic matters such as surface active agents or organic solvents.

As to the hydrogen peroxide waste water, in recent semiconductor factories, there is a tendency that organic matters such as surface active agents and organic solvents are mixed into the hydrogen peroxide waste water. This is because that, as the cleaning technique needs to be increasingly improved with the progress toward further microstructure of ICs, the cleaning effect is enhanced by mixing surface active agents into the cleaning chemicals. Accordingly, it is necessary to rationally treat both the hydrogen peroxide waste water and the waste water in which organic matters such as surface active agents and organic solvents are mixed, both of which are generated in the production room 1031 of the semiconductor factory in FIG. 17.

In prior art, however, as described before, hydrogen peroxide is decomposed into water and oxygen gas with a catalyst of activated carbon in one exclusive-use decomposition tank (hydrogen peroxide removal unit 1070). Meanwhile, organic matters such as surface active agents and organic solvents are solely treated biologically and/or physically in an activated carbon tower. In any case, the organic matters such as surface active agents or organic solvents and the hydrogen peroxide in the waste water is treated independently of each other. Accordingly, two units of a hydrogen peroxide removal unit and a biological treatment unit for the treatment of organic matters are required, which would cause an issue of high initial cost.

As shown in FIG. 17, in the production room 1031 of the semiconductor factory, many apparatuses are present such as the RCA cleaning unit 1037, the organic-solvent employing unit 1032, and other production units. Since chemicals containing hydrogen peroxide and organic matters such as surface active agents and organic solvents are used for cleaning in terms of production process, the production room 1031 would involve the generation of waste water in which hydrogen peroxide and organic matters such as surface active agents and organic solvents are mixed.

However, the conventional hydrogen peroxide removal unit 1070 alone can hardly treat organic matters such as surface active agents and organic solvents, unfortunately. This is because the conventional hydrogen peroxide removal unit 1070 has no microorganisms propagating on granular activated carbon owing to the sterilizing function of hydrogen peroxide, so that the unit cannot exploit the biological treatment by propagating microorganisms on activated carbon.

SUMMARY OF THE INVENTION

Therefore, the object of the present invention is to provide a waste water treatment equipment, as well as a waste water treatment method, by which fluorine waste water containing organic matters or hydrogen peroxide waste water containing organic matters can be treated efficiently and rationally in one tank.

In order to achieve the aforementioned object, a waste water treatment method according to an aspect of the present invention comprises the steps of:

defining a strong fluidization zone where reaction filler is strongly fluidized in waste water and a weak fluidization zone where the reaction filler is weakly fluidized in the waste water; and circulating the reaction fillers between the strong fluidization zone and the weak fluidization zone repeatedly to chemically treat the waste water in the strong fluidization zone through a chemical reaction between the reaction filler and the waste water and biologically treat the waste water in the weak fluidization zone by microorganisms on the reaction filler.

With this method, the reaction filler is strongly fluidized in the strong fluidization zone, so that the waste water can be chemically treated with high efficiency through vigorous chemical reaction between the reaction filler and substances in the waste water. Meanwhile, the reaction filler is weakly or lightly fluidized in the weak fluidization zone so as to allow microorganisms to propagate themselves on the reaction filler, so that organic matters in the waste water can be microbially treated by these microorganisms. Therefore, according to the invention, the same reaction filler can be utilized for both chemical treatment and biological treatment. Thus, waste water containing organic matters can be treated with high efficiency.

A waste water treatment apparatus according to another aspect of the present invention comprises a first water tank for receiving waste water to be treated which tank includes:

an upper part having reaction filler and aeration means for aerating and concurrently fluidizing the reaction filler in the waste water; and a lower part in which the reaction filler is settled so as to serve as an immobilizing carrier for microorganisms, wherein in the upper part the waste water is chemically treated through a chemical reaction between the waste water and the reaction filler in a fluidized state, while in the lower part organic matters in the waste water are biologically treated by the microorganisms immobilized to the reaction filler.

In the waste water apparatus, the reaction filler is fluidized, while being aerated, in the upper part of the first water tank. Accordingly, chemical reaction between the reaction filler and the waste water is accelerated. Therefore, waste water treatment by chemical reaction of the reaction filler is accomplished with high efficiency in the upper part of the first water tank. On the reaction filler falling from the upper part and settled in the lower part, microorganisms propagate themselves. Thus, in this lower part, organic matters in the waste water are biologically treated by the microorganisms immobilized to the reaction filler.

As seen above, according to the present invention, in one first water tank, the same reaction filler is exploited for both chemical treatment and biological treatment. Thus, the waste water containing organic matters can be treated cubically and rationally in one water tank, and initial costs and running costs can be reduced.

In an embodiment, the first tank further includes an air lift pump for pumping up the waste water with the reaction filler from the lower part and discharging the pumped waste water with the reaction filler into the upper part from above the waste water surface in the upper part.

In this waste water treatment apparatus, the waste water and the reaction filler contained therein are circulated from the lower part to the upper part by the air lift pump. Therefore, the reaction filler on which microorganisms have propagated in the lower part is aerated in the upper part, whereby the microorganisms are peeled off or separated from the reaction filler. Accordingly, the reaction filler, from which microorganisms have been peeled off in the upper part, recovers the state that it can vigorously chemically react, so that the waste water is treated efficiently through the chemical reaction. Then, the reaction filler in the upper part gradually sinks and settles in the lower part, resulting in that microorganisms grow on the settled reaction filler again and treat the organic matters in the waste water biologically.

As seen above, in this waste water treatment apparatus, while the reaction filler is being circulated around between the upper and lower parts by the air lift pump, the chemical reaction treatment in the upper part and the microbial treatment in the lower part are repeated continuously. Therefore, according to the present invention, there can be provided an epoch-making waste water treatment apparatus which allows both multidimensional treatment and high spatial efficiency to be achieved at the same time.

In an embodiment, the first water tank includes a screen for separating the reaction filler from the waste water present in the upper part.

The presence of the screen allows the reaction filler and the water treated in the first water tank to be separated from each other without causing the reaction filler to flow out of the first water tank.

In an embodiment, the reaction filler consists of calcium carbonate mineral.

In this case, fluorine waste water containing organic matters (referred to as "organic-matter-containing fluorine waste water" below) can be treated. More specifically, when organic-matter-containing fluorine waste water is first introduced into the upper part where the calcium carbonate mineral is strongly fluidized, fluorine in the waste water contacts and reacts with the calcium carbonate mineral to form calcium fluoride. In this way, fluorine in the waste water is chemically treated.

Next, while, calcium fluoride, a reaction product, is retained in the upper part of the first water tank by aeration, only the calcium carbonate mineral, which has a higher specific gravity, is gathered in the lower part of the first water tank. This lower part is a "zone of little fluidization".

Since the calcium carbonate mineral is "little fluidized" in the lower part of the first water tank, microorganisms will be immobilized to the calcium carbonate mineral and grow there. Then, these microorganisms on the calcium carbonate mineral biologically treat organic matters in the waste water, such as surface active agents and organic solvents.

If the lower part is in a state that the pH value of the water to be treated has been neutralized by the calcium carbonate mineral and that the calcium carbonate mineral is little fluidized, then various types of microorganisms can be immobilized to and propagated on the calcium carbonate mineral in the presence of organic matters. Accordingly, the calcium carbonate mineral on which these microorganisms have propagated is able to biologically degrade the organic matters in the water. In particular, it can be expected that microorganisms vigorously propagate themselves on the calcium carbonate more in a lower position of the lower part of the first water tank.

Next, the calcium carbonate mineral in the lower part moves slowly toward an inlet of the air lift pump along with the water, when the waste water treatment apparatus has it. The water within the air lift pump contains the calcium carbonate mineral at a high concentration, and the calcium carbonate mineral inside of the air lift pump is also strongly aerated and fluidized.

The microorganisms adhered on the surface of the calcium carbonate mineral are peeled off from the surface of the calcium carbonate mineral under intense aeration within the piping of the air lift pump. As a result, the surface of the calcium carbonate mineral is exposed. Then, in the air lift pump, the exposed surface of the calcium carbonate mineral and the water to be treated contact each other, whereby the fluorine in the water is primarily treated chemically. That is, fluorine in the water reacts with the calcium carbonate mineral to form calcium fluoride. It is to be noted that in the air lift pump, because aeration is effected, the possibility that calcium fluoride generated by the chemical reaction cover the surface of the calcium carbonate mineral is avoided.

The water, of which fluorine has been primarily treated within the air lift pump, is discharged from an outlet of the air lift pump, and dropped and introduced into the upper part of the first water tank where the concentration of calcium carbonate mineral is low. The outlet of the air lift pump is located in an upper position than the water level of the first water tank. Accordingly, while the water is falling from the outlet of the air lift pump into the first water tank, oxygen in the air and microorganisms in the air are included in the water.

Then, in the upper part, the water undergoes contact reaction with the calcium carbonate mineral in a fluidized state for a sufficient residence time. Thus, unreacted fluorine in the water is secondarily chemically treated reliably.

Next, the water lowers by gravity again to the "zone of little fluidization" of the lower part where the concentration of calcium carbonate mineral is high. The "zone of little fluidization" has the following characteristics, besides the fact that the concentration of calcium carbonate mineral is high: (1) the calcium carbonate mineral is little fluidized, (2) microorganisms are easily propagable because fluorine has been treated, (3) microorganisms in the air have been included in the water through the contact of the water with the air, (4) organic matters on which microorganisms easily grow are present in the water, and (5) since the pH of the water is approaching neutrality, microorganisms grow rapidly and acceleratedly on the calcium carbonate mineral of the "zone of little fluidization". The zone where microorganisms increase rapidly, ranges from intermediate to lower portions of the lower part of the first water tank. In addition, needless to say, microorganisms are easily propagable on the calcium carbonate mineral functioning as an immobilizing carrier.

Because of the above reasons (1), (2), (3), (4), and (5), the microorganism habitat environment is improved in the lower part, so that various types of aerobic microorganisms grow rapidly and increase by using the calcium carbonate mineral as an immobilizing carrier. Accordingly, in the lower part, organic matters such as surface active agents in the water are biologically treated. In this process, if the lower part were rapidly thrown into a state of strong fluidization, calcium carbonate mineral pieces would contact and collide with one another, which causes the biological membrane to be peeled off. As a result, microorganisms could not increase well. In contrast to this, pieces of the calcium carbonate mineral in the little fluidized state are brought into less contact with one another, so that the microorganisms are less likely to be peeled off from the calcium carbonate mineral. Also, when the calcium carbonate mineral is a natural product, it has irregular surfaces so that various types of microorganisms are allowed to propagate relatively easily on the calcium carbonate mineral. Then, these propagated microorganisms biologically treat organic matters containing primarily surface active agents and organic solvents in the water.

When microorganisms abruptly increase in the lower part of the first water tank, the pieces of calcium carbonate mineral in the lower part are formed into large masses of calcium carbonate mineral by masses of microorganisms. This would cause the lower part to tend to partly clog. However, the masses are collapsed by the suction of the air lift pump, which functions as a circulation mechanism for the whole first water tank, and by the subsequent circulation and strong aeration with the air in the air lift pump. Thus, the lower part will never clog.

When the reaction filler consists of activated carbon, hydrogen peroxide waste water containing organic matters (referred to as "organic-matter-containing hydrogen peroxide waste water" below) can be treated. More specifically, when organic-matter-containing hydrogen peroxide waste water is first introduced into the upper part where the activated carbon is strongly fluidized, hydrogen peroxide in the waste water is brought into contact with the activated carbon, and decomposed into water and an oxygen gas with the activated carbon taken as a catalyst. In this way, hydrogen peroxide in the water is treated chemically.

Next, the activated carbon is introduced to the zone of little fluidization in the lower part. In the lower part, since the activated carbon is little fluidized, organic matters are adsorption-treated by utilizing the activated carbon having an inherent physical adsorption function on organic matters. In upper portions of the lower part of the first water tank, because microorganisms are little propagated, good exertion of the physical adsorption function by the activated carbon can be expected.

Furthermore, because activated carbon is little fluidized in the lower part of the first water tank, microorganisms are immobilized to and propagated on the activated carbon. Therefore, organic matters such as surface active agents and organic solvents in the hydrogen peroxide waste water are biologically treated and degraded. Because the waste water contains organic matters, various types of microorganisms can propagate. In particular, it can be expected that microorganisms vigorously propagate themselves more in a lower position of the lower part of the first water tank.

Next, the activated carbon in the lower part moves slowly toward an inlet of the air lift pump along with the water, when the waste water treatment apparatus has it. The water within the air lift pump contains the activated carbon at a high concentration, and the activated carbon inside of the air lift pump is also strongly aerated and fluidized.

Part of microorganisms that have been propagating on the surfaces of the activated carbon are peeled off from the activated carbon surface under intense aeration in the piping of the air lift pump. At the same time, in order to avoid contact with the waste water containing hydrogen peroxide, part of microorganisms on the surface of the activated carbon, move to the interior of the activated carbon that offers a better and more convenient environment for the microorganisms to live in than the surface. As a result, the activated carbon surface is exposed. Then, the surface of the exposed activated carbon and the water are brought into contact with each other through aeration, thereby hydrogen peroxide contained in the water is primarily decomposed.

The water, of which hydrogen peroxide has been primarily treated by the air lift pump, is discharged through the outlet of the air lift pump, thus being dropped and introduced to the upper part of the first water tank where the concentration of activated carbon is low. The outlet of the air lift pump is located above the water level of the first water tank. Accordingly, when the water is dropped and introduced to the first water tank, oxygen in the air and microorganisms in the air will be mixed with the water.

Then, in the upper part, the water undergoes a contact reaction for a sufficient residence time with the -activated carbon in a fluidized state. Thus, undecomposed hydrogen peroxide in the water is secondarily decomposed into water and an oxygen gas reliably.

Next, the treated water lowers by gravity again to the "zone of little fluidization" in the lower part of the first water tank where the concentration of activated carbon is high. The "zone of little fluidization" has the following characteristics, besides the fact that the concentration of activated carbon is high: (1) the activated carbon is little fluidized; (2) microorganisms are easily propagable because hydrogen peroxide has been treated; (3) microorganisms in the air are included in the water through the contact of the water with the air; (4) organic matters that allow easy propagation of microorganisms are present in the water; and (5) since the microorganisms inside the activated carbon come out of the interior of the activated carbon as a result of improvement in the habitat environment, microorganisms grow and increase rapidly and acceleratedly on the activated carbon in the "zone of little fluidization". The zone where microorganisms increase rapidly, ranges from intermediate to lower portions of the lower part of the first water tank.

Because of the above reasons (1), (2), (3), (4) and (5), the microorganism habitat environment is improved in the lower part, so that various types of aerobic microorganisms grow rapidly and increase by using the calcium carbonate mineral as an immobilizing carrier. Accordingly, in the lower part, organic matters such as surface active agents in the water are biologically treated. In this process, if the lower part were rapidly thrown into a state of strong fluidization, activated carbon pieces would contact and collide with one another, which causes the biological membrane to be peeled off, as in the case of the reaction filler of calcium carbonate mineral. As a result, microorganisms could not increase well. In contrast to this, pieces of the activated carbon in the little fluidized state are brought into less contact with one another, so that the microorganisms are less likely to be peeled off from the activated carbon. Also, because the activated carbon is a porous material, various types of microorganisms will relatively easily propagate on the activated carbon. These microorganisms will propagate themselves not only on the surface but also in the interior of activated carbon. Then, these propagated microorganisms biologically treat organic matters containing primarily surface active agents and organic solvents in the water.

Meanwhile, in upper portions of the lower part of the first water tank, the concentration of activated carbon is high, and the water flows down slowly. Therefore, the activated carbon physically adsorbs the organic matters such as surface active agents and organic solvents. This makes it possible to lower values of the COD (Chemical Oxygen Demand) and TOC (Total Organic Carbon) as indexes of the organic matter concentration in the treated water. Further, the organic matters physically adsorbed onto the activated carbon are then biologically degraded by microorganisms inside the activated carbon. Accordingly, the activated carbon repeats the cycle of first physically adsorbing the organic matters and then degrading them by microorganisms propagated inside. As a result, there is no need for the work of taking out the activated carbon from the first water tank to regenerate it. Therefore, the running cost is reduced.

When microorganisms abruptly increase in the lower part of the first water. tank, the activated carbon in the lower part would tend to partly clog with masses of microorganisms. However, because the suction by the air lift pump, which functions as a circulation mechanism for the whole first water tank, and the subsequent circulation and strong aeration with the air in the air lift pump take place, the activated carbon will never clog.

In an embodiment, the waste water treatment apparatus described above further comprises a second water tank and aeration output control means for controlling output of the aeration means of the first water tank. Further, when waste water to be treated is organic-matter-containing fluorine waste water, the second water tank has a fluorine concentration meter for measuring fluorine concentration of water received from the first water tank. On the other hand, when waste water to be treated is organic-matter-containing hydrogen peroxide waste water, the second water tank has an oxidation-reduction potential meter for measuring oxidation-reduction potential of water received from the first water tank.

The water treated in the first water tank and containing microorganisms separated from the calcium carbonate mineral in the first water tank is introduced into the second water tank, in which it is separated into settling and supernatant.

When organic-matter-containing fluorine waste water is an object of treatment, the fluorine concentration meter installed in the second water tank detects the fluorine concentration of the water in the second water tank. Then, the aeration output control means controls the output of the aeration means in the first water tank in accordance with the fluorine concentration detected by the fluorine concentration meter. This control is such that the output of the aeration means, i.e., the quantity of discharged air is controlled so as to allow the reaction between calcium carbonate mineral and fluorine to be carried out reliably in the upper part of the first water tank. That is, if it is decided by the control means, based on the fluorine concentration measured by the fluorine concentration meter in the second water tank, that fluorine is not treated reliably in the first water tank, then the control means increases the quantity of air discharged by the aeration means. Then, the aerated contact state as well as the circulation state of the calcium carbonate mineral in the first water tank become intensified, so that the fluorine in the waste water can be treated reliably in the upper part of the first water tank.

The control means may be arranged so as to be actuated when the measurement value detected by the fluorine concentration meter of the second water tank has reached a specified set value. This set value may be set to a value slightly higher than a target fluorine concentration of treated water. For example, if the target fluorine concentration is 5 ppm, the set value may be 8 ppm. With such an arrangement, any deterioration in water quality of the treated water can be prevented beforehand. It is noted that one of possible reasons for increase of the fluorine concentration in the second tank is that microorganisms have propagated too much on the calcium carbonate mineral that is being fluidized in the upper part of the first water tank.

On the other hand, when organic-matter-containing hydrogen peroxide waste water is an object of treatment, the oxidation-reduction potential meter shows the potential value of the water under treatment in the second water tank. The measured potential is a value representing whether or not hydrogen peroxide has been surely decomposed in the upper part of the first water tank. Therefore, upon confirming that hydrogen peroxide in the waste water has not been surely decomposed, based on the oxidation-reduction potential obtained from the oxidation-reduction potential meter, the aeration output control means increases the output of the aeration means of the first water tank. As a result, the activated carbon becomes more vigorously fluidized in the upper part of the first water tank, so that decomposition of hydrogen peroxide by catalytic reaction is promoted. At the same time, microorganisms that have propagated in the lower part of the first water tank are prevented from being sterilized by hydrogen peroxide. Moreover, the increase in the output of the aeration means in the first water tank produces an effect of preventing microorganisms from propagating on the surface of activated carbon in the upper part. When microorganisms have propagated on the surface of the activated carbon in the upper part, the catalytic action of activated carbon is weakened, so that its ability of decomposing hydrogen peroxide also lowers.

In an embodiment, the waste water treatment apparatus further comprises sludge return means for returning sludge settled and separated in the second water tank to the first water tank.

The sludge return means returns to the first water tank biological sludge which includes microorganisms that have settled in the second water tank serving as a settling tank. Accordingly, the microorganism concentration in the first water tank is increased. Therefore, organic matters such as surface active agents and organic solvents can be treated rationally. When a trace amount (a few ppm) of polyaluminum chloride is added to the first water tank, fine reaction products of calcium fluoride can be coagulated or flocculated in the second water tank almost without causing the electrical conductivity to increase. Sludge that settles down in the second water tank contains not only biological sludge but also chemical inorganic sludge.

In an embodiment, the waste water treatment apparatus further comprises equipment for subjecting the water treated in the second tank to a reverse osmosis membrane treatment and then producing ultrapure water from the water subjected to the reverse osmosis membrane treatment.

According to the present invention, the waste water treatment apparatus does not use slaked lime nor coagulants in the fluorine treatment process. Accordingly, the electrical conductivity of water treated in the second water tank, or a supernatant separated from the sludge, can be made below 800 $\mu$s/cm. Therefore, by subjecting the water treated in the second tank to a reverse osmosis membrane treatment, the treated water becomes usable for production of ultrapure water. According to the present invention, waste water discharged even from semiconductor factories can be treated up to such ultrapure water as can be used in semiconductor factories. Thus, a water reclamation cycle can be completed in a semiconductor factory.

In contrast, in the conventional equipment, since chemicals such as slaked lime and coagulants were used, the electrical conductivity of the resulting treated water was as high as more than 1400 μs/cm. As a result, it was difficult to use the treated water in ultrapure water production devices.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a conceptual view of an ninth embodiment of the invention;

FIG. 11 is a timing chart for operation of the first, second, third, and fourth embodiments;

FIG. 12 is a timing chart for operation of the fifth, sixth, and seventh embodiments;

DETAILED DESCRIPTION OF THE PREFERRED EMBODIMENTS

The waste water treatment apparatus of the present invention is described in more detail hereinbelow based on embodiments thereof as illustrated in the accompanying drawings.

Figure 1:
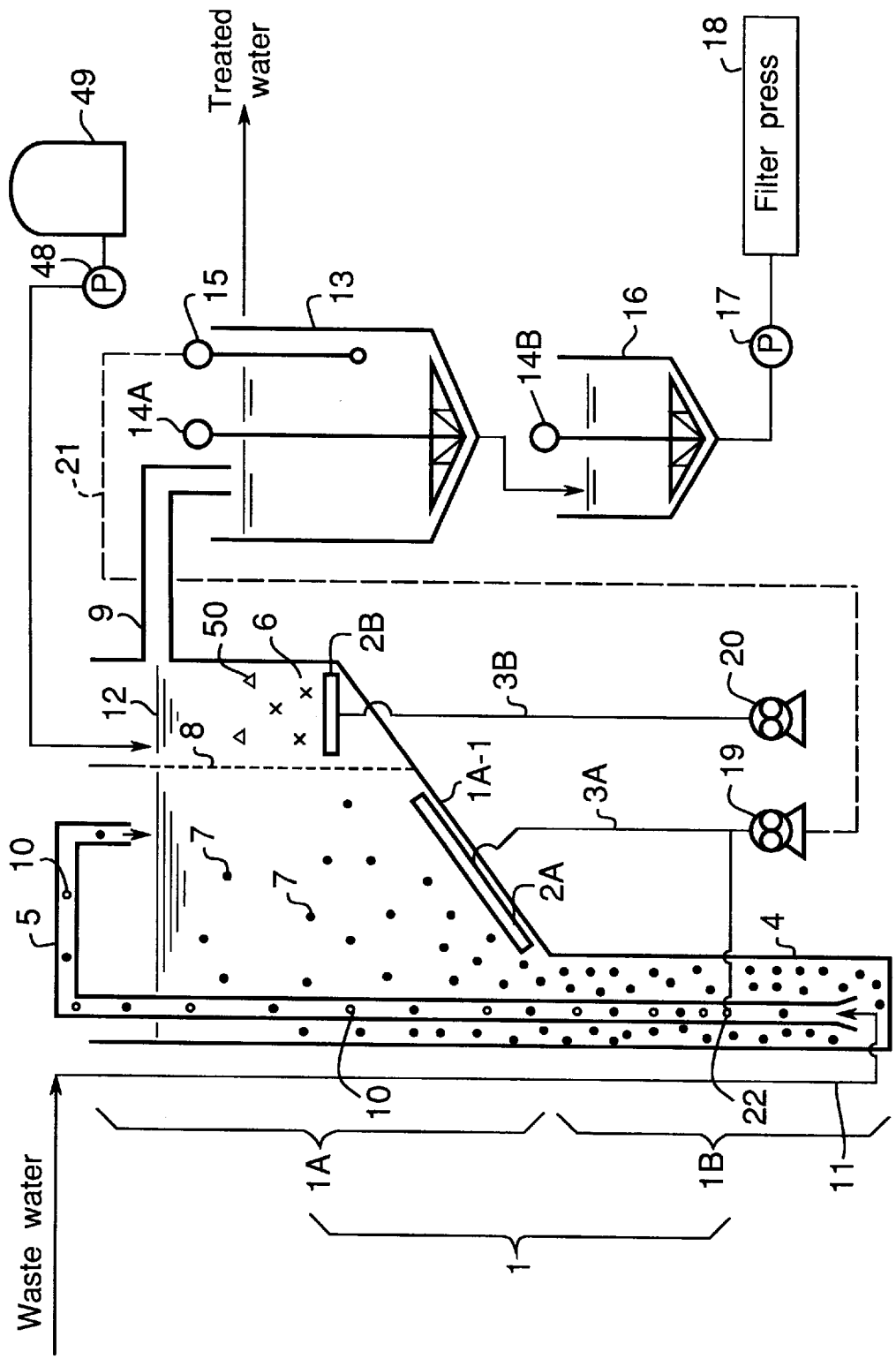
FIG. 1 is a conceptual view of a fluorine waste water treatment apparatus according to a first embodiment of the present invention.

First Embodiment:

FIG. 1 shows a treatment apparatus for organic-matter-containing fluorine waste water as a first embodiment of the waste water treatment apparatus according to the present invention. This first embodiment is a waste water treatment apparatus which can successfully and rationally treat both organic matters, such as surface active agents and organic solvents, and fluorine in the waste water with one water tank.

This waste water treatment apparatus works primarily in the following principles of treatment: (1) calcium carbonate mineral is utilized as the calcium material for fluorine treatment in a relatively strong fluidization state so as to contribute to the removal of fluorine; and (2) the calcium carbonate mineral is also utilized as an immobilizing carrier for microorganisms in a relatively weak fluidization state so as to contribute to the removal of organic matters. The waste water treatment apparatus is designed to execute two different treatments of (1) and (2) with a single first water tank 1.

Accordingly, the first embodiment is an epoch-making organic-matter-containing fluorine waste water treatment apparatus which is low not only in initial costs but also in running and maintenance costs.

As shown in FIG. 1, the first embodiment comprises the first water tank 1, a second water tank 13, a third water tank 16, a filter press 18 as a dehydrator, and a polyaluminum chloride tank 49.

The first water tank 1 has an upper part 1A and a lower part 1B. The upper part 1A is opened upward. This upper part 1A has a tilted wall 1A-1. Therefore, the upper part 1A is tapered downward from a vertical center thereof, adjoining the lower part 1B at the lower end thereof. The lower part 1B has a straight side wall extending vertically. A waste water inlet pipe 11 is placed near the bottom surface of the lower part 1B. To this pipe 11, fluorine waste water containing organic matters is introduced. Also, granular calcium carbonate mineral 7 is added to the first water tank 1.

Within the first water tank 1, an air lift pump 5 is placed. This air lift pump 5 extends straight upward from near the bottom of the lower part 1B, passing through the upper part 1A, and outside of the water surface of waste water. The air lift pump 5 then bends generally horizontally above the upper part 1A, extending a specified length horizontally, and bending downward vertically and extending up to slightly above the waste water surface. The lowermost end of the air lift pump 5 is opened downward in a bell shape, that is, bell-mouthed, and an end of the waste water inlet pipe 11 is located within this bell-mouthed portion. Slightly above the bell-shape portion, an air diffuser 22 for the air lift pump is placed. This air diffuser 22 is connected to a first blower 19 through an air pipe. Another air pipe 3A is extended from the first blower 19, and an air diffuser 2A is connected to an end of the air pipe 3A. The air diffuser 2A is disposed along the tilted wall 1A-1 of the upper part 1A. Slightly above and beside the air diffuser 2A, another air diffuser 2B is placed. The air diffuser 2B is connected to a second blower 20 through an air pipe 3B. Between the air diffuser 2A and the air diffuser 2B, a screen 8 is placed. This screen 8 extends from the tilted wall 1A-1 past the waste water surface so as to partition the upper part 1A. A portion partitioned by this screen 8 and including the air diffuser 2B is a microbial sludge agitation part 12. To the agitation part 12 is connected a pipe that originates from the polyaluminum chloride tank 49 via a quantitative pump 48.

An outflow pipe 9 extends horizontally from the agitation part 12. The outflow pipe 9 reaches an upper position of the second water tank 13, bending downward at its horizontal end. The second water tank 13 is a settling tank. The second water tank 13 has a collector 14A and a fluorine concentration meter 15. This fluorine concentration meter 15 is connected to the first blower 19 with a signal transfer line 21. Output of the first blower 19 is controlled by a signal outputted from the fluorine concentration meter 15 to the signal transfer line 21. Final treated water of this waste water treatment apparatus is taken out from the second water tank 13. A pipe for sludge is connected at the bottom of the second water tank 13. Sludge accumulated at the bottom of the second water tank 13 is introduced to the third water tank 16 via the sludge pipe. The third water tank 16 is a concentrating tank. One more sludge pipe is connected to the bottom of the third water tank 16, and this sludge pipe is connected to the filter press 18 via a sludge pump 17. The filter press 18 is one type of dehydrator.

In the waste water treatment apparatus constructed as described above, organic-matter-containing fluorine waste water is first introduced to the bottom of the lower part 1B of the first water tank 1 through the waste water inlet pipe 11. Then, with the first blower 19 operated, air is introduced from the air diffuser 2A into the upper part 1A. By this air, the waste water in the upper part 1A is aerated and agitated, so that the water is fluidized strongly. At the same time, the air diffuser 22 for the air lift pump blows out air, causing the air lift pump 5 to operate, so that waste water present near the bottom of the lower part 1B is guided upward along with the granular calcium carbonate mineral 7 and air bubbles 10. The waste water, calcium carbonate mineral 7, and air bubbles 10 guided upward are discharged from above the upper part 1A toward the waste water surface by the air lift pump 5. In this first water tank 1, the waste water and the calcium carbonate mineral 7 in the upper part 1A are strongly aerated by the air diffuser 2A so as to be kept in a strong fluidization state. Meanwhile, the waste water and the calcium carbonate mineral 7 in the lower part 1B are not subject to direct aeration by an air diffuser. Accordingly, the calcium carbonate mineral 7 once flowed from the upper part 1A into the lower part 1B naturally drops by gravity, being directed toward the lower end of the air lift pump 5. Then, the calcium carbonate mineral 7 that has reached the lower end of the air lift pump 5 is sucked into the air lift pump 5 from its lowermost bell-mouthed end, then moving upward. Therefore, in the zone in the lower part 1B outside the air lift pump 5, the calcium carbonate mineral 7 is in a weaker fluidization state than in the upper part 1A.

In the upper part 1A, the calcium carbonate mineral 7 vigorously contacts with the waste water through the strong fluidization, whereby the reaction with fluorine in the waste water is prompted. Therefore, fluorine in the waste water can be formed into calcium fluoride by this reaction of the calcium carbonate mineral 7. The calcium fluoride, the specific gravity of which is smaller than that of the calcium carbonate mineral 7, passes the screen 8 in an upper position of the upper part 1A, reaching the adjacent microbial sludge agitation part 12. Meanwhile, the calcium carbonate mineral 7, which has a specific gravity (2.7) larger than that of calcium fluoride, gradually lowers, guided by the tilted wall 1A-1, toward the lower part 1B. In this lower part 1B, without strong aeration by the air diffuser 2A, the calcium carbonate mineral 7 is in a fluidization state weaker than when the calcium carbonate mineral 7 is in the upper part 1A, thus moving downward slowly. Then, near the bottom of the lower part 1B, the calcium carbonate mineral 7 is sucked into the air lift pump 5, moving upward along with the air bubbles 10 and the waste water. In this lower part 1B, since the calcium carbonate mineral 7 is in a weak fluidization state, microorganisms will be relatively easily generated, grown, and immobilized to the calcium carbonate mineral 7 as time elapses. These microorganisms that have grown on the surface of the calcium carbonate mineral 7 can treat organic matters such as surface active agents contained in the waste water by biological reaction. Furthermore, the microorganisms that have propagated on the calcium carbonate mineral 7 are peeled off within the air lift pump 5 through aeration by the air diffuser 22. Therefore, the calcium carbonate mineral 7 returned to the upper part 1A through the air lift pump 5 is released from the clogging with the microorganisms, so that the calcium carbonate mineral 7 no longer has the function of biological treatment. As a result, chemical reaction with fluorine in the waste water is now vigorously carried out again.

In this air lift pump 5, a primary fluorine treatment action (i.e., chemical reaction between calcium carbonate mineral 7 and fluorine in the waste water) can be expected only to some extent. This is because although the concentration of the calcium carbonate mineral 7 within the air lift piping is very high, the time period for which the calcium carbonate mineral 7 moves along with air within the air lift piping is a few to ten seconds, as shown in FIG. 11, that is, the residence time of the calcium carbonate mineral 7 in the air lift pump 5 is an extremely short one on the order of seconds. The main function of aeration within the air lift pump 5 is to separate the microorganisms from the surface of the calcium carbonate mineral 7. It is therefore a subordinate function to mix and chemically react the fluorine in the waste water with the calcium carbonate mineral 7, from which microorganisms have been separated, or peeled off.

After sucked into the air lift pump 5, the calcium carbonate mineral 7, from which microorganisms have been peeled off, and waste water under treatment, are resupplied with oxygen by aeration in the air lift pump 5. Further, the waste water is supplied with oxygen and microorganisms in the air through its exposure to the air effected while the waste water drops from the outlet of the air lift pump 5 to the upper part 1A.

Then, in the upper part 1A, the calcium carbonate mineral 7, from which microorganisms have been separated, and the waste water are put into enough catalytic reaction with each other in a fluidized state by the air discharged from the air diffuser 2A. As a result of this, fluorine in the organic-matter-containing fluorine waste water is formed into a reaction product of calcium fluoride more reliably, so that the fluorine concentration of the waste water lowers. When a calcium carbonate mineral having a particle size of 0.5 mm or less is adopted as the calcium carbonate mineral 7, and when the residence time of the water in the upper part 1A is set to 4 hours or more, the fluorine in the waste water is treated reliably.

The quantity of air discharged from the air diffuser 2A is desirably 120 $m^3$ or more per day on the basis of a 1 $m^3$ volume of the upper part 1A. If the quantity of discharged air is smaller, the heavy calcium carbonate mineral 7, whose specific gravity is as large as 2.7, could not be put into a reliable strong fluidization state. The air to be discharged by the air diffuser 2A is supplied from the first blower 19 via the air pipe 3A.

Since the tank defining the upper part 1A is tapered downward, the calcium carbonate mineral 7 naturally gathers to the lower part 1B along the tilted wall 1A-1 of the tapered tank, so that the concentration of the calcium carbonate mineral 7 in the lower part 1B becomes higher than that of the calcium carbonate mineral 7 in the upper part 1A. Also since the tank volume of the upper part 1A is far greater than that of the lower part 1B, the calcium carbonate mineral 7 settled in the lower part 1B is concentrated to a high concentration.

In an upper zone of the lower part 1B, the calcium carbonate mineral 7 will not be much fluidized, but be kept in a mild fluidization (weak fluidization state). The calcium carbonate mineral 7 in such a weak fluidization state offers a preferable environment for microorganisms to propagate themselves. In addition, since the pH of the water under treatment has already been neutralized by the calcium carbonate mineral 7, microorganisms in the upper zone of the lower part 1B vigorously propagate themselves by taking organic matters in the water as the nutrition source. The speed at which the water flows down in the lower part 1B may be set on the basis of 1 meter per hour. This flow-down speed is similar to the flow-down speed in an activated carbon adsorption tower for the normal water treatment. Therefore, microorganisms are allowed to sufficiently grow on the calcium carbonate mineral 7 that flow down at this speed. Although varying depending on the concentration of organic matters, microorganisms actually well propagate under the condition of a flow-down speed of 1 m/hour in water treatment.

Although varying depending on the concentration of organic matters in the water, it may occur that making the flow-down speed in the lower part 1B much slower than 1 m/hour causes the calcium carbonate mineral 7 to jam in the lower part 1B. Therefore, it is important to hold the flow-down speed of 1 m/hour in the lower part 1B. The flow-down speed in the lower part 1B depends on the amount of calcium carbonate mineral 7 thrown into the first water tank 1 and the power of the air lift pump 5. The quantity of calcium carbonate mineral 7 to be thrown into the first water tank 1 may be determined based on a standard value of about 10% of the entire volume of the first water tank 1.

In order that the calcium carbonate mineral 7 will not clog due to excessive propagation of microorganisms below in the lower part 1B of the first water tank 1, the calcium carbonate mineral 7 is sucked up appropriately by the air lift pump 5 so as to be circulated to the upper part 1A. That is, the calcium carbonate mineral 7 particles that have gathered in the lower part 1B of the first water tank 1 are transferred to the upper part 1A along with air bubbles 10 by the air lift pump 5. The calcium carbonate mineral 7, of which the specific gravity is 2.7 but the particle size is 0.5 mm or less, is a substance that can relatively easily be fluidized in water.

In the upper part 1A, the calcium carbonate mineral particles 7 are fluidized and agitated efficiently not only by the air bubbles 10 discharged by the air diffuser 2A that aerates the inside of the upper part 1A but also by water stream due to the suction of the air lift pump 5. Then, the calcium carbonate mineral 7 descends gradually from the upper part 1A toward the lower part 1B, guided by the tilted wall 1A-1, to a "little-fluidized calcium carbonate mineral part 4". The calcium carbonate mineral 7 that has descended slowly is again sucked up by the air lift pump 5, moving from the lower part 1B to the upper part 1A along with the air bubbles 10. In this way, the calcium carbonate mineral 7 is fluidized and circulated over and over again in the first water tank 1 along with the waste water.

In this first embodiment, a calcium carbonate mineral 7 having a particle size of 0.5 mm or less is adopted as the filler material. Therefore, the calcium carbonate mineral 7 has a large reaction surface area on the whole, and can be easily pumped up by the air lift pump 5. Further, the calcium carbonate mineral 7 can be easily maintained in its balanced relation with the aeration of the air diffuser 2A in the upper part 1A. This balanced relation refers to a state in which the calcium carbonate mineral 7 is normally kept in a fluidized state by aeration without fast precipitation. For this reason, the fluidized state of the calcium carbonate mineral 7 is formed over a wide range in the first water tank 1.

Residence times for which the water resides in the upper part 1A and in the lower part 1B of the first water tank 1, respectively, should be determined depending on both the fluorine concentration and the surface active agent inflow concentration. Based on the grounds that the fluorine concentration is 30 to 300 ppm and that the COD concentration of surface active agents and organic solvents is about a few ppm, the residence time in the upper part 1A was set to 4 hours or more and the residence time in the lower part 1B was set to 1 hour or more, with the safety coefficient included. That is, the residence time of water in the first water tank 1 was set to a total of 5 hours or more.

Generally, calcium carbonate mineral is commercially available in various particle sizes. Therefore, it is most economical to adopt a commercially available product as the calcium carbonate mineral 7. The calcium carbonate mineral is lowest in price at a particle size of 1 mm or 0.5 mm, and the unit price increases as the particle size becomes larger. Accordingly, in terms of reaction efficiency and cost, the particle size of calcium carbonate mineral is preferably less than 2 mm. If the particle size of calcium carbonate mineral 7 is 2 mm or larger, the reaction time in the first water tank 1 needs to be set to 8 hours or more. In this case, there arises a need of increasing the size of the first water tank 1, which would increase the initial cost, as compared with the case where calcium carbonate mineral 7 having a particle size of 0.5 mm is adopted.

Next, the water under treatment passes through the screen 8, moving to the microbial sludge agitation part 12, which is an upper lateral portion in the upper part 1A. In this process, most of the calcium carbonate mineral particles 7 are blocked by the screen 8, while microbial sludge 6 passes through the screen 8. This means that the calcium carbonate mineral 7 and the microbial sludge 6 are separated from each other by the screen 8. However, some of the granules of the calcium carbonate mineral 7 are small enough to pass the screen 8, and others have been changed to smaller particle sizes as time elapses due to the aeration agitation. These small particles of the calcium carbonate mineral 7 will pass through the screen 8.

The interior of the microbial sludge agitation part 12 is lightly aerated by the air diffuser 2B. This light aeration is weaker than the strong aeration effected by the air diffuser 2A. Such weak aeration allows settling of the granules of the calcium carbonate mineral 7 that have passed through the screen 8, while fluidizing the microbial sludge 6.

To this microbial sludge agitation part 12, a trace amount of polyaluminum chloride derived from the polyaluminum chloride tank 49 is added by the quantitative pump 48. Then, fine particles of calcium fluoride that have passed through the screen 8 and entered the agitation part 12 are coagulated by the trace amount of polyaluminum chloride into large flocs. In this embodiment, by setting the addition quantity of polyaluminum chloride to below a few ppm, increase in the electrical conductivity is suppressed, so that raw water for ultrapure water production devices is reclaimed from the waste water. However, when the treated waste water is not utilized as the raw water for ultrapure water production devices, the addition quantity of polyaluminum chloride may be beyond a few ppm.

By the formation of flocs, chemical inorganic sludge 50 is formed in the agitation part 12. This inorganic sludge 50 and the microbial sludge 6 have specific gravities lower than 2.7 and close to 1. Accordingly, they will be moved up by light aeration, flowing into the second water tank 13 via the outflow pipe 9. The reason of adding the polyaluminum chloride not to the second water tank 13 but to the agitation part 12, is that the second water tank 13 has no function of quick agitation so that the coagulation reaction of polyaluminum chloride will not progress smoothly.

Meanwhile, the small granules of calcium carbonate mineral 7 that have passed the screen 8 settle down in the microbial sludge agitation part 12, descending along the tilted wall 1A-1 and moving toward the lower part 1B. The quantity of air discharged from the second blower 20 in the microbial sludge agitation part 12 may be below 5 $m^3$ per day for a 1 $m^3$ volume of the first water tank 1.

Next, the water under treatment containing the inorganic sludge 50 and microbial sludge 6 flowing out from the microbial sludge agitation part 12 into the outflow pipe 9 enters the second water tank 13. This second water tank 13 is a settling tank, which is set to a settling time of 3 hours or more. In the second water tank 13, the inorganic sludge 50 and microbial sludge 6 that have settled at the tapered bottom portion are collected up by the collector 14A, whereby the inorganic sludge 50 and microbial sludge 6 are separated from supernatant.

In the first embodiment, the settling time in the microbial sludge agitation part 12 is set to 30 minutes. Accordingly, the settling time in the microbial sludge agitation part 12 is much shorter than the settling time in the second water tank 13 (3 hours). The calcium carbonate mineral 7 particles, which have a good settling property, are less likely to flow out from the microbial sludge agitation part 12. The inorganic sludge 50 and the microbial sludge 6, on the other hand, are likely to flow out from the sludge agitation part 12. That is, from the mixture of the calcium carbonate mineral 7, the inorganic sludge 50, and the microbial sludge 6, the microbial sludge agitation part 12 can securely extract the inorganic sludge 50 and the microbial sludge 6 and introduce them to the outflow pipe 9.

Since the settling time in the second water tank 13 (3 hours) is longer than that in the microbial sludge agitation part 12, the inorganic sludge 50 and microbial sludge 6 that have not settled in the microbial sludge agitation part 12 will settle in the second water tank (settling tank) 13. These settled inorganic sludge 50 and microbial sludge 6 flow into the third water tank (concentrating tank) 16. The residence time in this concentrating tank 16 may appropriately be 10 hours or more. In this concentrating tank 16, the inorganic sludge 50 composed primarily of polyaluminum chloride and calcium fluoride as well as the microbial sludge 6 are concentrated slowly in a prolonged time. The inorganic sludge 50 originating from polyaluminum chloride and the microbial sludge 6 has poor dehydratability, compared with inorganic sludge generated by the addition of common chemicals such as slaked lime. Therefore, the sludge concentrated in the third water tank 16 is further introduced to the filter press 18 by the sludge pump 17. Then the concentrated sludge is dehydrated in the filter press 18. The filter press 18 is a dehydrator which has a relatively good performance. It is the object of the filter press 18 to obtain a dehydrated cake with a moisture content of 65% or lower, which is more or less variable depending on the capability of the filter press 18. Note that the quantity of sludge generated from the filter press 18 is far smaller than that generated in the conventional fluorine treatment process using large amounts of slaked lime or coagulants.

In the first embodiment, when the fluorine concentration of the water within the second water tank 13 is elevated higher than a specified value, the fluorine concentration meter 15 and an adjustment meter (not shown) installed in the second water tank 13 provide a signal to the signal transfer line 21. Upon receiving this signal, the first blower 19 is compelled to increase the quantity of discharged air by inverter control. Then, the quantity of air discharged from the air diffuser 2A and the air diffuser 22 is increased, making strong both the agitation by air diffusion in the upper part 1A of the first water tank 1 and the in-tank circulation power by the air lift pump 5. The strong aeration and the strong circulation accelerate the chemical reaction between the fluorine in the waste water and the calcium carbonate mineral 7. As a result, the formation of calcium fluoride is accelerated and the fluorine concentration in the water lowers.

What should be noted here are the reaction in the upper part 1A and the reaction in the lower part 1B of the first water tank 1. Normally, since the upper part 1A of the first water tank 1 is fluidized and agitated by the air lift pump 5, a chemical reaction treatment between the calcium carbonate mineral 7 and the fluorine in the waste water is carried out in the upper part 1A. In the lower part 1B of the first water tank 1, on the other hand, a biological treatment on the organic matters such as surface active agents and organic solvents is carried out. In this lower part 1B of the first water tank 1, the calcium carbonate mineral particles 7 have a function as an immobilizing carrier for the biological treatment. As time elapses, microorganisms propagate themselves increasingly on the surfaces of the calcium carbonate mineral particles 7 being fluidized. Accordingly, the calcium carbonate mineral 7 deteriorates in the ability of removing fluorine. Then, the fluorine concentration of the water in the second water tank 13, which is a settling tank, is increased. Then, by a signal derived from the fluorine concentration meter 15 that has detected the increase in the fluorine concentration, the inverter control for the first blower 19 is executed, so that the strong aeration by the air diffuser 2A and the strong circulation by the air lift pump 5 are effected. The result is that the residence time of the calcium carbonate mineral 7 in the lower part 1B of the first water tank 1 becomes 1 hour or less, so that most of the calcium carbonate mineral 7 present in the first water tank 1 can lend itself to the decomposition of fluorine. In addition, in this first embodiment, when the organic-matter concentration in the fluorine waste water is higher than normal, the number of cycles of circulation within the first water tank 1 is not larger than 1 cycle/hour, in which case microorganisms will propagate on the calcium carbonate mineral 7 in the lower part 1B in amounts greater than normal, resulting in increased organic-matter treatment ability. Also in the first embodiment, it has been arranged that when the quantity of air discharged from the air diffuser 2A is set at 120 $m^3$ per day for a 1 $m^3$ volume of the upper part 1A, the residence time of water in the upper part 1A is 4 hours or more. However, when the quantity of air discharged from the air diffuser 2A is set at 200 $m^3$ or more per day per volume of the upper part 1A ($m^3$), setting the residence time in the upper part 1A at 1 hour and increasing the number of cycles of circulation can ensure the reliable treatment of waste water, as shown in field (1) in FIG. 11. Field (2) in FIG. 11 shows a timing chart for a fluorine concentration higher than normal.

As already described, the residence time in the lower part 1B depends on the quantity of air discharged from the air diffuser 22 of the air lift pump 5. That is, if the quantity of air is decreased, then the residence time in the lower part 1B is prolonged, so that the microbial treatment ability is increased, while the fluorine treatment ability is decreased. In this way, by increasing or decreasing the quantity of air discharged from the air diffuser 22, the proportion of the fluorine treatment ability to the microbial treatment ability can be increased or decreased.

Figure 2:
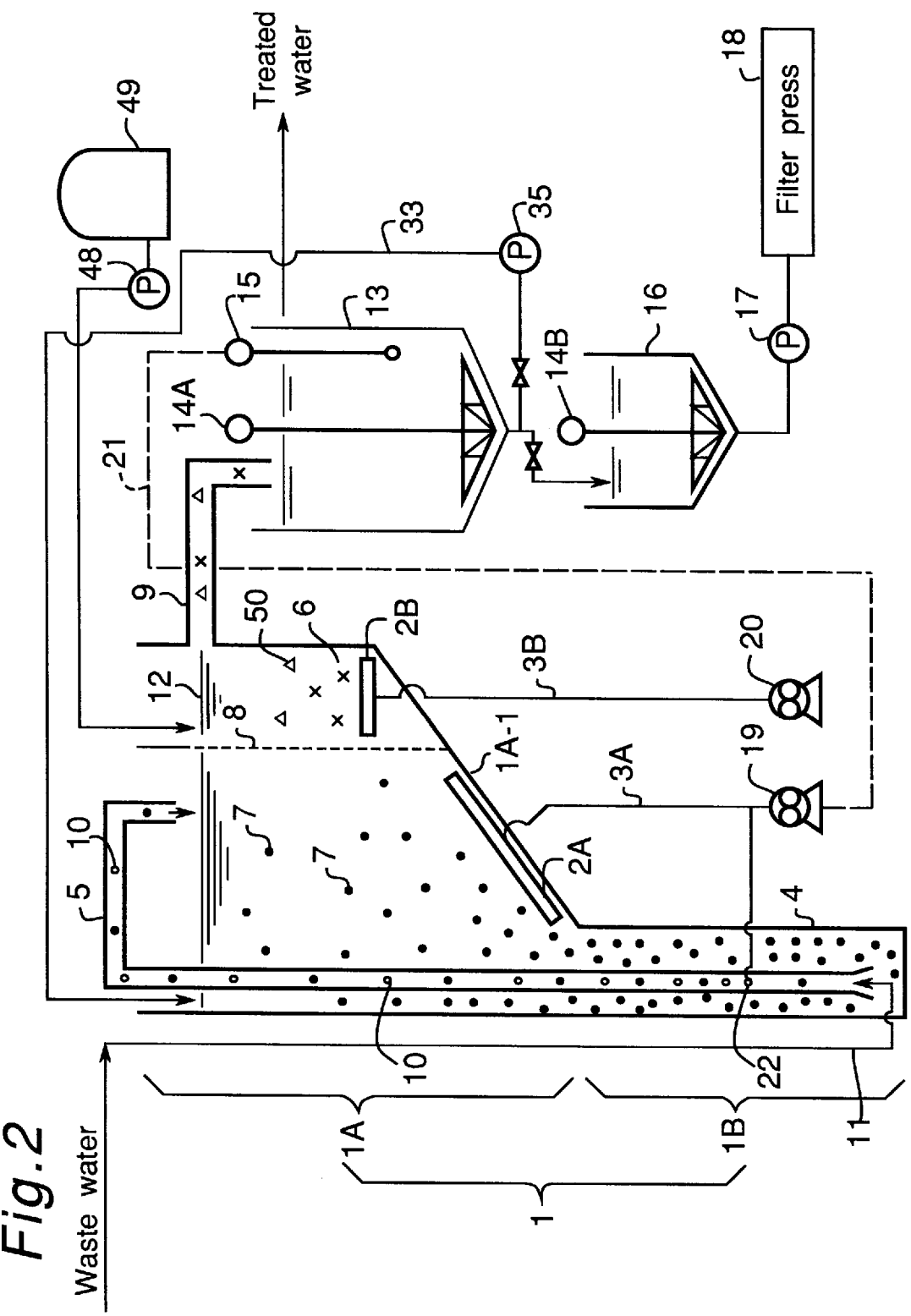
FIG. 2 is a conceptual view of a second embodiment of the invention, which is a modification of the first embodiment.

Second Embodiment:

Next, FIG. 2 shows a second embodiment of the waste water treatment apparatus according to the invention. This second embodiment differs from the first embodiment only in that the second embodiment further comprises a sludge return pipe 33 for returning sludge from the second water tank (settling tank) 13 to the upper part 1A of the first water tank 1 in the first embodiment shown in FIG. 1. Therefore, the second embodiment is described with emphasis placed on the differences from the first embodiment.

The sludge return pipe 33 is equipped with a pump 35. By operating this pump 35, the inorganic sludge 50 and the microbial sludge 6 that have settled in the second water tank 13 are passed through the sludge return pipe 33 and sprinkled onto the waste water surface in the upper part 1A of the first water tank 1. The inorganic sludge 50 returned to the upper part 1A of the first water tank 1 is constituted principally of flocs of aluminum hydroxide, lending themselves to the treatment of fluorine in the waste water. The microbial sludge 6 returned to the upper part 1A serves the treatment of organic matters in the treated water.

In the second embodiment, by returning the inorganic sludge 50 and the microbial sludge 6 that have settled in the second water tank 13 to the upper part 1A of the first water tank 1 as described above, the inorganic-sludge concentration and the microbial concentration in the first water tank 1 are increased. Thus, the treatment effect for fluorine and organic matters is enhanced more rationally.

Figure 3:
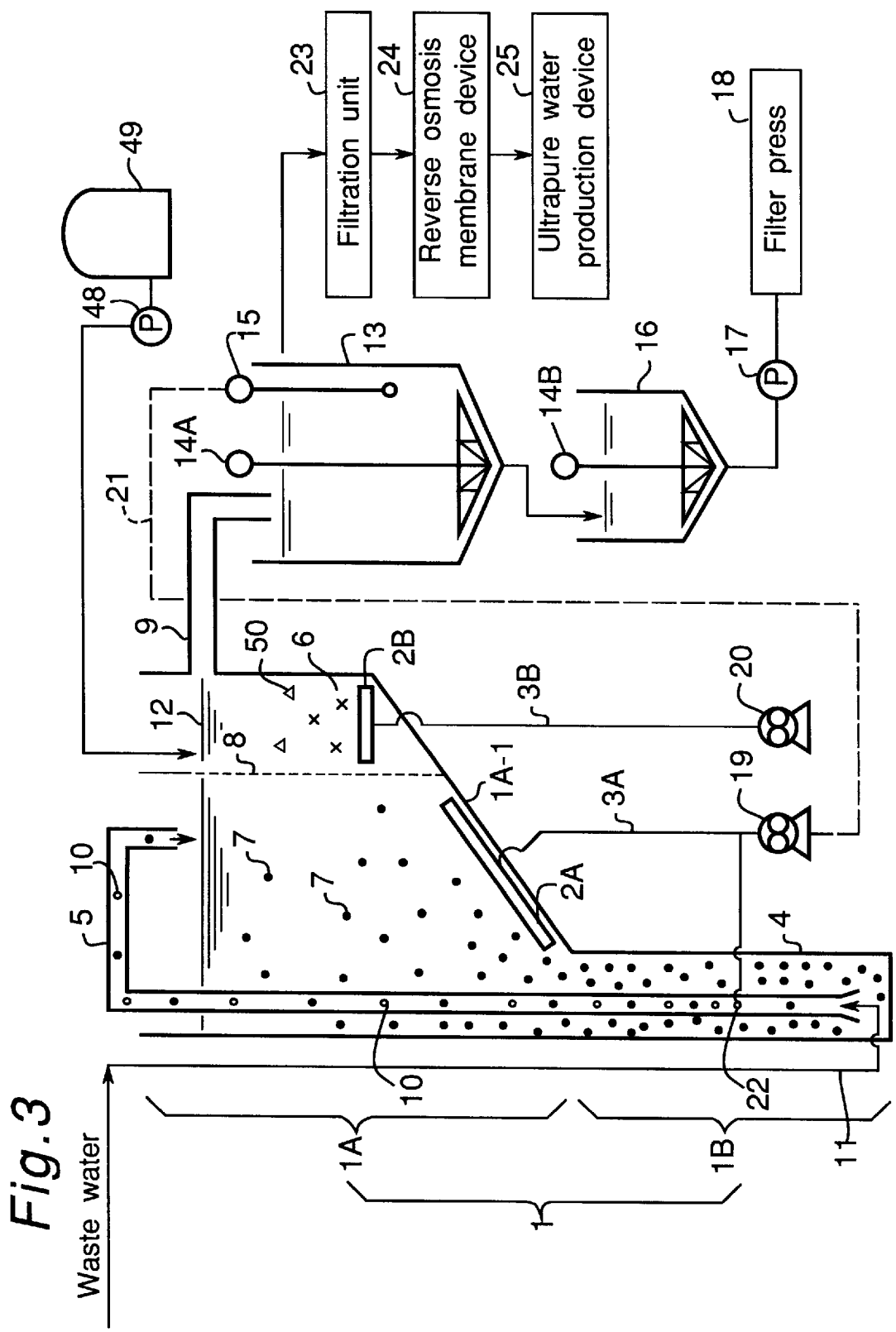
FIG. 3 is a conceptual view of a third embodiment of the invention, which is also a modification of the first embodiment.

Third Embodiment:

Next, FIG. 3 shows a third embodiment of the present invention. This third embodiment differs from the first embodiment of FIG. 1 only in that the third embodiment further comprises a filtration unit 23 to which the water from the second water tank 13 is introduced, a reverse osmosis membrane device 24, and an ultrapure water production device 25. Therefore, the third embodiment is described with emphasis placed on the differences from the first embodiment.

This third embodiment is designed to be able to produce ultrapure water from organic-matter-containing fluorine waste water. The water containing more or less suspended solids and derived from the second water tank 13 is filtered by the filtration unit 23 so that the suspended solids are removed. Anthracite is used as the filtering medium of the filtration unit 23.

Next, the filtered water has its dissolved ions, organic matters, and even contained microorganisms securely removed by the reverse osmosis membrane device 24. The reverse osmosis membrane device 24 has a common sterilizing unit and pH adjustment unit, as well as a micro filter for the protection of the reverse osmosis membrane.

From this reverse osmosis membrane device 24, water that has been securely treated in terms of pH, fluorine or other ions, organic matters, suspended solids, electrical conductivity, and the like is obtained. Accordingly, by treating the resulting treated water in the conventional type ultrapure water production device 25, ultrapure water can be obtained.

Figure 4:
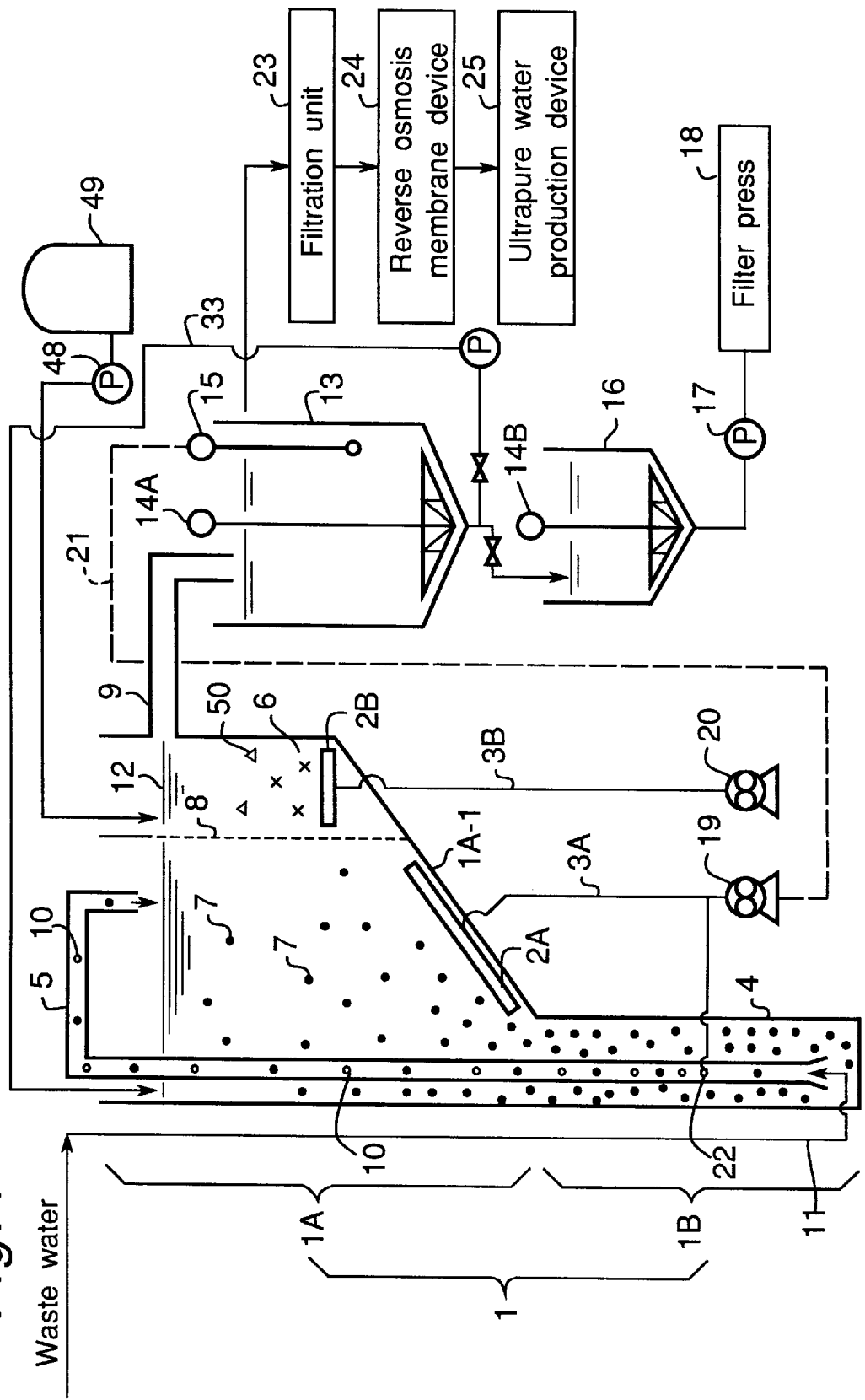
FIG. 4 is a conceptual view of a fourth embodiment of the invention, which is also a modification of the first embodiment.

Fourth Embodiment:

Next, FIG. 4 shows a fourth embodiment of the invention. This fourth embodiment is a combination of the second embodiment and the third embodiment. More specifically, the fourth embodiment differs from the first embodiment of FIG. 1 in only the following two points: (1) it further comprises a sludge return pipe 33 for returning sludge from the second water tank 13 to the upper part 1A of the first water tank 1; and (2) it also comprises a filtration unit 23, a reverse osmosis membrane device 24, and an ultrapure water production device 25, to which the treated water from the second water tank 13 is introduced.

Therefore, the fourth embodiment is of course able to obtain ultrapure water as in the third embodiment. Besides, because the waste water treatment efficiency in the first water tank 1 is enhanced beyond the first embodiment, as in the second embodiment, the fourth embodiment can improve the ultrapure water production capacity more than the third embodiment.

Experimental Example:

Next described is an actual experimental example. As an actual experimental example of the treatment of organic-matter-containing fluorine waste water, a treatment apparatus having the same construction as that of the organic-matter-containing fluorine waste water treatment apparatus as shown in FIG. 1 was used. In this treatment apparatus, the volume of the first water tank 1 was set to about 1.6 m$^3$, the volume of the microbial sludge agitation part 12 was set to about 0.1 m$^3$, the volume of the second water tank 13 was set to about 0.4 m$^3$, and the volume of the third water tank (concentrating tank) 16 was set to about 0.3 m$^3$.

In this experiment, waste water containing fluorine and organic matters such as surface active agents or organic solvents was treated, of which waste water the pH was 6.4, the fluorine concentration was 163 ppm, and the TOC as organic matters was 6.1 ppm, prior to treatment. As a result of treating this waste water with the treatment apparatus, the pH became 7.4, the fluorine concentration became 6 ppm or less (about $\frac{1}{27}$ of that prior to treatment), and the TOC became 1.5 ppm (about $\frac{1}{4}$ of that prior to treatment).

Next explained is another experimental example. In this experimental example, by using a treatment apparatus having the same construction as that of the organic-matter-containing fluorine waste water reclamation apparatus as shown in FIG. 3, an experiment of treatment of organic-matter-containing fluorine waste water was conducted. In this treatment apparatus, the volume of the first water tank 1 was set to about 1.6 m$^3$, the volume of the microbial sludge agitation part 12 was set to about 0.1 m$^3$, the volume of the second water tank 13 was set to about 0.4 m$^3$, the volume of the concentrating tank 16 was set to about 0.3 m$^3$, the volume of the filtration unit 23 was set to about 0.3 m$^3$, and the reverse osmosis membrane device 24 was implemented by one unit.

In this experiment, organic-matter-containing fluorine waste water was treated, of which waste water the pH was 6.2, the fluorine concentration was 166 ppm, the TOC as organic matters was 6.2 ppm, and the electrical conductivity was 134 $\mu$s/cm, prior to treatment. As a result of treating this waste water with the treatment apparatus, in terms of water quality of the reclaimed water for the ultrapure water production device 25, the pH became 7.3, the fluorine concentration became 0.5 ppm ($\frac{1}{332}$ of that prior to treatment) or less, the TOC became 0.5 ppm (about $\frac{1}{12}$ of that prior to treatment) or less, and the electrical conductivity became 26 $\mu$s/cm (about $\frac{1}{5}$ of that prior to treatment) or less.

Next, a treatment apparatus for organic-matter-containing hydrogen peroxide waste water as a waste water treatment apparatus of the present invention is described in detail based on embodiments thereof as illustrated in the accompanying drawings.

Figure 5:
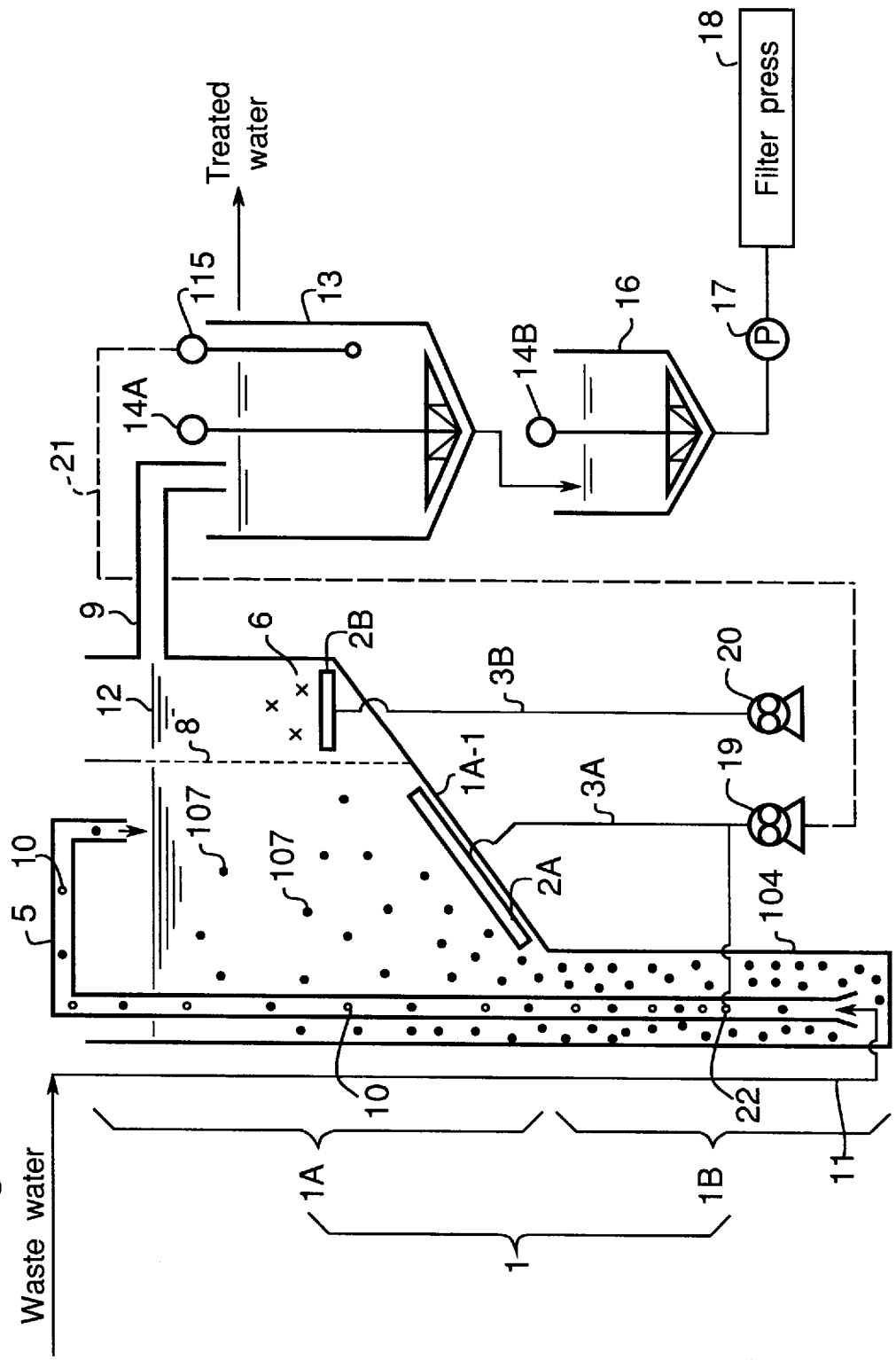
FIG. 5 is a conceptual view showing a hydrogen peroxide waste water treatment apparatus according to a fifth embodiment of the invention.

Fifth Embodiment:

FIG. 5 shows an organic-matter-containing hydrogen peroxide waste water treatment apparatus of this fifth embodiment. The fifth embodiment is a waste water treatment apparatus which can rationally treat both organic matters, such as surface active agents or organic solvents, and hydrogen peroxide in the waste water with one water tank.

This waste water treatment apparatus works primarily in the following principles of treatment: (1) activated carbon is utilized as a catalyst for decomposition of hydrogen peroxide in its relatively strong fluidization state so as to contribute to the removal of hydrogen peroxide; (2) the activated carbon is utilized in its adsorption ability in its relatively weak fluidization state to adsorb organic matters; and (3) the activated carbon is also utilized as an immobilizing carrier for microorganisms in its relatively weak fluidization state so as to contribute to the decomposition of organic matters. The waste water treatment apparatus is designed to execute different treatments of these (1), (2), and (3) with a single first water tank 1. As described below, the fifth embodiment is a treatment apparatus which can treat both hydrogen peroxide and organic matters such as surface active agents or organic solvents three-dimensionally and rationally.

Accordingly, this fifth embodiment is an epoch-making organic-matter-containing hydrogen peroxide waste water treatment apparatus which is low not only in initial costs but also in running and maintenance costs.

As seen from FIG. 1 and FIG. 5, the fifth embodiment differs from the waste water treatment apparatus of the first embodiment shown in FIG. 1, only in four points that: (1) activated carbon 107 is contained in the first water tank 1 instead of the calcium carbonate mineral 7; (2) hydrogen peroxide waste water is introduced to the first water tank 1 instead of fluorine waste water; (3) the present waste water apparatus has no polyaluminum chloride tank 49; and an oxidation-reduction potential meter 115 is installed in the second water tank 13 instead of the fluorine concentration meter 15. Accordingly, the fifth embodiment is described with emphasis placed on the differences from the first embodiment. The same components as in the first embodiment are designated by the same numerals.

The residence time in each water tank of the waste water treatment apparatus is shown in FIG. 12. Field (1) of FIG. 12 shows the timing chart for normal hydrogen peroxide concentration, and field (2) shows the timing chart for a hydrogen peroxide concentration higher than normal. The timing chart helps understanding of the operation of the apparatus.

In the fifth embodiment constructed as described above, hydrogen peroxide waste water is first introduced to the bottom of the lower part 1B of the first water tank 1 through the waste water inlet pipe 11. This hydrogen peroxide waste water contains organic matters. Then, with the first blower 19 operated, air is introduced from the air diffuser 2A into the upper part 1A. By this air, the waste water in the upper part 1A is aerated and agitated, so that the water is fluidized strongly. At the same time, the air diffuser 22 for the air lift pump blows out air, causing the air lift pump 5 to operate, so that waste water present near the bottom of the lower part 1B is introduced upward along with the granular activated carbon 107 and air bubbles 10. The waste water, activated carbon 107, and air bubbles 10 introduced upward are sprinkled from above the upper part 1A on the waste water surface by the air lift pump 5. In this first water tank 1, the waste water and the activated carbon 107 in the upper part 1A are strongly aerated by the air diffuser 2A so as to be kept in a strong fluidization state. Meanwhile, the waste water and the activated carbon 107 in the lower part 1B are not subject to direct aeration by the air diffuser. Accordingly, the activated carbon 107 once flowed from the upper part 1A into the lower part 1B naturally drops by its own weight, being directed toward the lower end of the air lift pump 5. Then, the activated carbon 107 that has reached the lower end of the air lift pump 5 is sucked into the air lift pump 5 from its lowermost, bell-mouthed end, then moving upward. Therefore, in the zone in the lower part 1B outside the air lift pump 5, the activated carbon 107 is in a weaker fluidization state than in the upper part 1A.

In the upper part 1A, the activated carbon 107 vigorously contacts with the waste water through the strong fluidization, whereby the decomposition of hydrogen peroxide in the waste water by catalytic reaction of the activated carbon is prompted. The activated carbon 107 gradually drops, guided by the tilted wall 1A-1, toward the lower part 1B. In this lower part 1B, without strong aeration by the air diffuser 2A, the activated carbon 107 is in a fluidization state weaker than when the activated carbon 107 is in the upper part 1A, thus lowering slowly. Then, near the bottom of the lower part 1B, the activated carbon 107 is sucked into the air lift pump 5, and moves upward along with the air bubbles 10 and the waste water. In this lower part 1B, since the activated carbon 107 is in a weak fluidization state, microorganisms will be relatively easily propagated, and immobilized to the activated carbon 107 as time elapses. These microorganisms that have propagated on the surface of the activated carbon 107 can treat organic matters such as surface active agents contained in the waste water by the biological reaction. Furthermore, the microorganisms that have propagated on the activated carbon 107 are peeled off within the air lift pump 5 through aeration by the air diffuser 22. Therefore, the activated carbon 107 returned to the upper part 1A through the air lift pump 5 is released from the clogged state with the microorganisms, so that the activated carbon 107 no longer has the function of biological treatment. Thus, the catalytic reaction of the activated carbon with hydrogen peroxide in the waste water and the function of adsorbing organic matters are now vigorously carried out again.

In the air lift pump 5, a primary hydrogen peroxide treatment action (i.e., decomposition of hydrogen peroxide in the waste water by the catalytic reaction of the activated carbon 107) can be expected only to some extent. This is because although the concentration of the activated carbon 107 within the air lift piping is very high, the time period for which the activated carbon 107 moves along with air within the air lift piping is just a few seconds, that is, the residence time of the activated carbon 107 in the air lift pump 5 is an extremely short one on the order of seconds. The main function of aeration within the air lift pump 5 is to peel off the microorganisms from the surface of the activated carbon 107. It is therefore a subordinate function of the aeration in the air lift pump 5 to mix and catalytically react the hydrogen peroxide in the waste water with the activated carbon 107 from which microorganisms have been peeled off.

After sucked into the air lift pump 5, the activated carbon 107, from which microorganisms have been separated, and waste water under treatment are resupplied with oxygen by aeration in the air lift pump 5. Further, the water is supplied with oxygen and microorganisms in the air through the exposure to the air effected when the water drops from the outlet of the air lift pump 5 to the upper part 1A.

It is noted that the microorganisms on the surface of the activated carbon 107 are sterilized in the air lift pump 5 to some degree by the hydrogen peroxide in the waste water, but microorganisms in the interior of the activated carbon 107 are not sterilized. Accordingly, the microorganisms in the interior of the activated carbon 107 are allowed to survive.

Then, in the upper part 1A, the activated carbon 107, from which microorganisms have been separated, and the water are put into enough catalytic reaction with each other in a fluidized state by the air discharged from the air diffuser 2A. As a result of this, hydrogen peroxide in the waste water is decomposed positively, resulting in an oxygen gas and water.

The quantity of air discharged from the air diffuser 2A is desirably 120 $m^3$ or more per day on the basis of a 1 $m^3$ volume of the upper part 1A. If the quantity of discharged air is smaller, the activated carbon 107 cannot be put into a strong fluidization state. The air to be discharged by the air diffuser 2A is supplied from the first blower 19 via the air pipe 3A.

Since a portion defining the upper part 1A is tapered downward, the activated carbon 107 naturally gathers to the lower part 1B moving along the tilted wall 1A-1 of the tapered portion, so that the concentration of the activated carbon 107 in the lower part 1B becomes higher than that of the activated carbon 107 in the upper part 1A. Also since the tank volume of the upper part 1A is far greater than that of the lower part 1B, the activated carbon 107 settled in the lower part 1B is increased to a high concentration.

The upper part 1A of the first water tank 1 performs both the decomposition process of hydrogen peroxide and the decomposition process of organic matters. Also, the lower part 1B performs both the decomposition process of hydrogen peroxide and the decomposition process of organic matters. Accordingly, in principle, the volume of the upper part 1A should be made equal to the volume of the lower part 1B. However, when the content of organic matters is high, the volume of the lower part 1B should be larger than that of the upper part 1A. When the content of hydrogen peroxide is high, the volume of the upper part 1A should be larger than that of the lower part 1B.

If the residence time of water in the upper part 1A of the first water tank 1 is one hour or more, hydrogen peroxide is reliably decomposed. In the upper part 1A, suspended microorganisms are sterilized by hydrogen peroxide in the waste water, but microorganisms in the interior of the activated carbon 107 are not sterilized. Accordingly, the surface of the activated carbon 107 serves as a catalyst for decomposing hydrogen peroxide, while the interior of the activated carbon 107 serves as a "residence for microorganisms" which keeps microorganisms alive. Therefore, in the upper part 1A, the activated carbon 107, while internally keeping microorganisms in reserve, securely decomposes hydrogen peroxide with a sufficient residence time. The water, of which hydrogen peroxide has been decomposed, is then introduced naturally to the lower part 1B.

In an upper zone of the lower part 1B, the activated carbon 107 will not be much fluidized, but be kept in a mild fluidization (weak fluidization state). The activated carbon 107 in such little fluidized state offers an effect of physically adsorbing organic matters. Also, the activated carbon 107 in the little fluidized state offers a preferable environment for propagation of the microorganisms kept in the interior of the activated carbon 107. In an upper zone of the lower part 1B, microorganisms vigorously propagate themselves by taking the organic matters in the water as the nutrition source. The speed at which the water flows down in the lower part 1B may be set on the basis of 1 meter per hour. This flow-down speed is similar to the flow-down speed in the activated carbon adsorption tower for the normal water treatment. Therefore, the activated carbon 107 flowing down at this speed can physically adsorb organic matters, and moreover microorganisms can propagate themselves sufficiently on the activated carbon 107 flowing down at such a speed. Although varying depending on the concentration of organic matters, it is an actuality that microorganisms will well propagate under the condition of a flow-down speed of 1 meter/hour in water treatment.

Although varying depending on the concentration of organic matters in the water, it may occur that decreasing the flow-down speed in the lower part 1B much lower than 1 meter/hour causes the activated carbon 107 to jam in the lower part 1B. Therefore, it is important to hold the flow-down speed of 1 meter/hour in the lower part 1B. The flow-down speed in the lower part 1B depends on the amount of activated carbon 107 thrown into the first water tank 1 and the ability of the air lift pump 5. The quantity of activated carbon 107 to be thrown into the first water tank 1 may be determined based on a standard value of about 20% of the entire volume of the first water tank 1.

In order that the activated carbon 107 will not clog due to excessive propagation of microorganisms below in the lower part 1B of the first water tank 1, the activated carbon 107 is sucked up appropriately by the air lift pump 5 so as to be circulated to the upper part 1A. That is, the activated carbon 107 that has gathered in the lower part 1B of the first water tank 1 is transferred to the upper part 1A along with the air bubbles 10 by the air lift pump 5. The activated carbon 107 is a substance that is relatively easily fluidized in water although its specific gravity is more than 1.

In the upper part 1A, the activated carbon 107 is fluidized and agitated efficiently by the air bubbles 10 discharged by the air diffuser 2A that aerate the inside of the upper part 1A and by water stream due to the suction of the air lift pump 5. Then, the activated carbon 107 descends gradually from the upper part 1A toward the lower part 1B, guided by the tilted wall 1A-1, to a "little-fluidized activated carbon part 104". The activated carbon 107 that has descended slowly is again sucked up by the air lift pump 5, moving from the lower part 1B to the upper part 1A along with the air bubbles 10. In this way, the activated carbon 107 is fluidized and circulated over and over again in the first water tank 1 along with the waste water. As described above, the activated carbon 107 undergoes repeated propagation and separation of microorganisms, whereby one granule of activated carbon 107 performs the decomposition of hydrogen peroxide in one process and the same granule of activated carbon 107 performs the adsorption and decomposition of organic matters in another process.

The activated carbon 107 can be easily maintained in its balanced relation with the aeration of the air diffuser 2A in the upper part 1A. This balanced relation refers to a state in which the activated carbon 107 is normally kept in a fluidized state by aeration without settling fast. For this reason, the fluidized state of the activated carbon 107 is formed over a wide range in the first water tank 1. In this embodiment, particulate activated carbon is adopted as the activated carbon 107.

Residence times for which the water resides in the upper part 1A and in the lower part 1B of the first water tank 1 should be determined depending on both the hydrogen peroxide concentration and the surface active agent inflow concentration. Based on the grounds that the hydrogen peroxide concentration is 30 to 500 ppm and that the COD concentration of surface active agents and organic solvents is about a few ppm, the residence time in the upper part 1A was set to 1 hour or more and the residence time in the lower part 1B was set to 1 hour or more, with the safety coefficient included. That is, the residence time of water in the first water tank 1 was set to a total of 2 hours or more.

In this case, of course, the volume of the upper part 1A and the volume of the lower part 1B were set equal to each other.

Next, the water under treatment passes through the screen 8, moving to the microbial sludge agitation part 12, which is an upper lateral portion in the upper part 1A. In this process, most of the activated carbon 107 particles are blocked by the screen 8, while microbial sludge 6 passes through the screen 8. This means that the activated carbon 107 and the microbial sludge 6 are separated from each other by the screen 8. However, some of the particles of the activated carbon 107 are small enough to pass the screen 8, and others have been changed to smaller particle sizes with time due to the aeration agitation. These small particles of the activated carbon 107 will pass through the screen 8.

The interior of the microbial sludge agitation part 12 is lightly aerated by the air diffuser 2B. This light aeration is weaker than the strong aeration effected by the air diffuser 2A. Such weak aeration allows settling of the particles of the activated carbon 107 that have passed the screen 8, while fluidizing the microbial sludge 6. The microbial sludge 6 in the agitation part 12, whose specific gravity is close to 1, will be moved up by light aeration, flowing into the second water tank 13 via the outflow pipe 9.

Meanwhile, the small granules of activated carbon 107 that have passed the screen 8 settle down in the microbial sludge agitation part 12, descending along the tilted wall 1A-1 toward the lower part 1B. The quantity of air discharged from the second blower 20 in the microbial sludge agitation part 12 may be below 5 $m^3$ per day on the basis of a 1 $m^3$ volume of the first water tank 1.

Next, the water containing the microbial sludge 6 flowing out from the microbial sludge agitation part 12 into the outflow pipe 9 enters the second water tank 13. This second water tank 13 is a settling tank, which is set to a settling time of 3 hours. In the second water tank 13, the microbial sludge 6 that have settled at the tapered bottom portion is collected up by the collector 14A, where the microbial sludge 6 and supernatant are separated from each other.

In this fifth embodiment, the settling time in the microbial sludge agitation part 12 is set to 30 minutes, as shown in FIG. 12. Accordingly, the settling time in the microbial sludge agitation part 12 is much shorter than the settling time in the second water tank 13 (3 hours). Therefore, the activated carbon 107 particles, which have a good settling property, are less likely to flow out from the microbial sludge agitation part 12. The microbial sludge 6, on. the other hand, is likely to flow out from the sludge agitation part 12. That is, the microbial sludge agitation part 12 can securely extract the microbial sludge 6 from the mixture of the activated carbon is 107 and the microbial sludge 6 and introduce the microbial sludge to the outflow pipe 9.

Since the settling time in the second water tank 13 is as long as 3 hours, a longer period as compared with that in the microbial sludge agitation part 12, the microbial sludge 6 that has not settled in the microbial sludge agitation part 12 settles in the second water tank 13. This settled microbial sludge 6 enters the third water tank 16, which is an concentrating tank. The microbial sludge 6 has poor dehydratability, compared with inorganic sludge generated by the addition of common chemicals such as slaked lime. Therefore, the sludge concentrated in the third water tank 16 is further introduced to the filter press 18 by the sludge pump 17. Then the concentrated sludge is dehydrated by the filter press 18.

In the fifth embodiment, when the oxidation-reduction potential of the water within the second water tank 13 is elevated higher than a specified value, the oxidation-reduction potential meter 115 and an adjustment meter (not shown) installed in the second water tank 13 output a signal to the signal transfer line 21. Upon receiving this signal, the first blower 19 is compelled to increase the quantity of discharged air by inverter control. Then, the quantity of air discharged from the air diffuser 2A and the air diffuser 22 is increased, making strong both the agitation by air diffusion in the upper part 1A of the first water tank 1 and the in-tank circulation power by the air lift pump 5. The strong aeration and the strong circulation accelerate the catalytic reaction of the activated carbon 107 with hydrogen peroxide in the waste water. As a result, the decomposition of hydrogen peroxide is accelerated and the hydrogen peroxide concentration in the water lowers.

With regard to the reaction in the upper part 1A and the reaction in the lower part 1B of the first water tank 1, the activated carbon 107 in the upper part 1A and in the air lift pump 5 normally serves as a catalyst for the decomposition of hydrogen peroxide. The activated carbon 107 in the lower part 1B, on the other hand, serves not only as an adsorptive of the organic matters such as surface active agents and organic solvents, but also as an immobilizing carrier for biological treatment.

As the running time elapses, microorganisms come to propagate themselves increasingly on the surface of the activated carbon 107 that is being fluidized over the entire first water tank 1. Then, the activated carbon 107 deteriorates in the ability of decomposing hydrogen peroxide. In this case, since the hydrogen peroxide concentration in the settling tank 13 is increased, the quantity of air discharged by the first blower 19 is inverter-controlled as described above, so that the strong aeration and the strong circulation are effected. As a result, the residence time for which the activated carbon 107 stays in the lower part 1B is shortened to 1 hour or less. This allows most of the activated carbon 107 in the first water tank 1 to lend itself to the decomposition of hydrogen peroxide, so that the decomposition of hydrogen peroxide by the activated carbon 107 in the upper part 1A is prompted. In addition, in the fifth embodiment, when the organic-matter concentration in the hydrogen peroxide waste water is higher than normal, the number of cycles of circulation within the first water tank 1 is not higher than 1 cycle/hour, in which case microorganisms propagate on the activated carbon 107 of the lower part 1B in amounts greater than normal, offering an increased organic-matter treatment ability.

Figure 6:
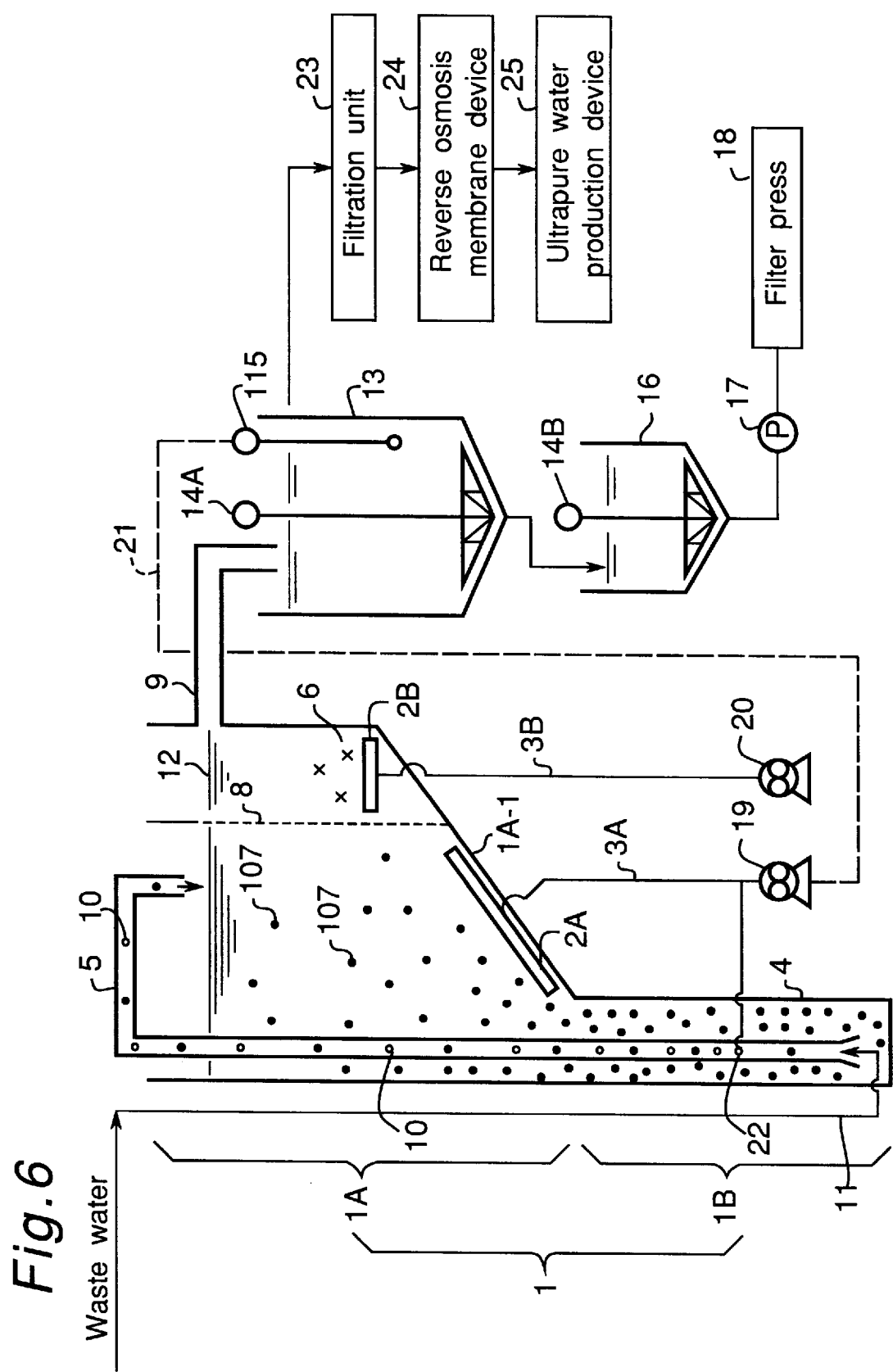
FIG. 6 is a conceptual view of a sixth embodiment of the invention, which is a modification of the fifth embodiment.

Sixth Embodiment:

Next, FIG. 6 shows a sixth embodiment of the waste water treatment apparatus according to the invention. This sixth embodiment differs from the fifth embodiment of FIG. 5 only in that the sixth embodiment further comprises a filtration unit 23, a reverse osmosis membrane device 24, and an ultrapure water production device 25, to which the treated water from the second water tank 13 is introduced. Therefore, the sixth embodiment is described with emphasis placed on the differences from the fifth embodiment.

This sixth embodiment is designed to produce ultrapure water from organic-matter-containing hydrogen peroxide waste water. The water containing a little suspended solids and introduced from the second water tank 13 is filtered by the filtration unit 23 so that the suspended solids are removed. Anthracite is used as the filtering medium of the filtration unit 23.

Next, the filtered water has its dissolved ions, organic matters, and even contained microorganisms securely removed by the reverse osmosis membrane device 24. The reverse osmosis membrane device 24 has a common sterilizing unit and pH adjustment unit, as well as a micro filter for the protection of the reverse osmosis membrane.

From this reverse osmosis membrane device 24, water that has been securely treated in terms of pH, fluorine or other ions, organic matters, suspended solids, electrical conductivity is obtained. Accordingly, by treating the resulting treated water in the conventional type ultrapure water production device 25, ultrapure water can be obtained.

Experimental Example:

Next described is an actual experimental example. In a treatment apparatus having the same construction as that of the organic-matter-containing hydrogen peroxide waste water treatment apparatus as shown in FIG. 5, the volume of the first water tank 1 was set to about 1.6 $m^3$, the volume of the microbial sludge agitation part 12 was set to about 0.1 $m^3$, the volume of the settling tank 13 was set to about 0.4 $m^3$, and the volume of the concentrating tank 16 was set to about 0.3 $m^3$.

In this experiment, waste water containing hydrogen peroxide and organic matters such as surface active agents or organic solvents was treated, of which waste water the pH was 6.1, the hydrogen peroxide concentration was 112 ppm, and the TOC as organic matters was 5.2 ppm, prior to treatment. As a result of treating this waste water with the treatment apparatus, the pH became 7.2, the hydrogen peroxide concentration became 1 ppm or less, and the TOC became 1.2 ppm. That is, in this experiment, the hydrogen peroxide concentration of the waste water was able to be lowered to less than $1/100$, and the TOC concentration was able to be lowered to less than $1/4$.

Next explained is another experiment. In this experiment, a reclamation apparatus having the same construction as that of the organic-matter-containing hydrogen peroxide waste water reclamation apparatus as shown in FIG. 6 was used. In this reclamation apparatus, the volume of the first water tank 1 was set to about 1.6 $m^3$, the volume of the microbial sludge agitation part 12 was set to about 0.1 $m^3$, the volume of the second water tank 13 was set to about 0.4 $m^3$, the volume of the concentrating tank 16 was set to about 0.3 $m^3$, the volume of the filtration unit 23 was set to about 0.3 $m^3$, and the reverse osmosis membrane device 24 was implemented by one unit.

In this experiment, organic-matter-containing hydrogen peroxide waste water was treated, of which waste water the pH was 6.2, the hydrogen peroxide concentration was 126 ppm, the TOC as organic matters was 5.8 ppm, and the electrical conductivity was 128 $\mu s/cm$, prior to treatment. As a result of treating this waste water with the apparatus, in terms of water quality of the reclaimed water for the ultrapure water production device 25, the pH became 7.3, the hydrogen peroxide concentration became 0.5 ppm or less, the TOC became 0.5 ppm or less, and the electrical conductivity 22 $\mu s/cm$ or less. That is, according to this experiment, the hydrogen peroxide concentration was able to be made less than $1/250$ and the TOC was able to be made less than $1/10$.

Figure 7:
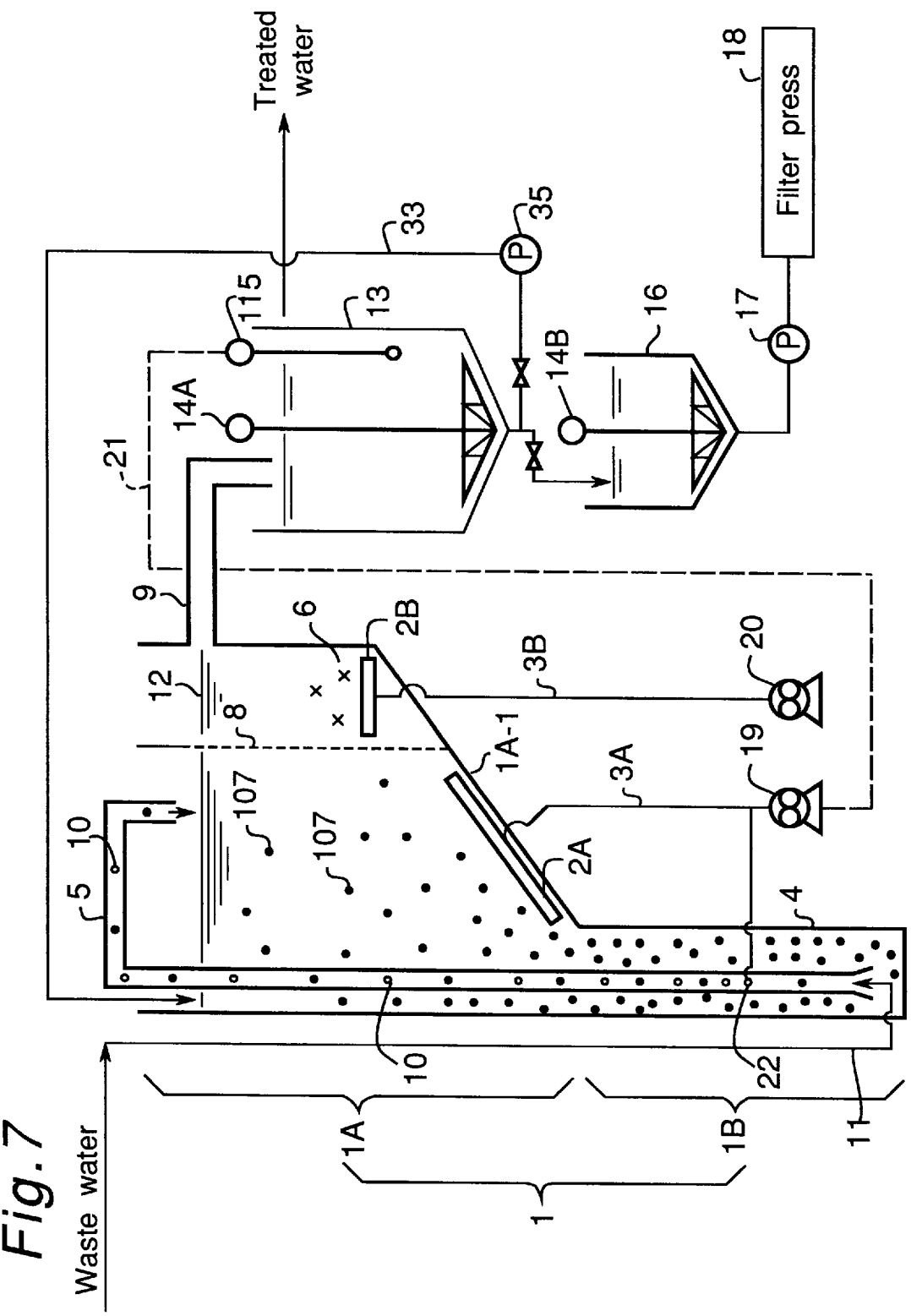
FIG. 7 is a conceptual view of a seventh embodiment of the invention, which is also a modification of the fifth embodiment.

Seventh Embodiment:

Next, FIG. 7 shows a seventh embodiment of the invention. This seventh embodiment differs from the fifth embodiment only in that the former further comprises a sludge return pipe 33 for returning sludge from the second water tank 13 to the upper part 1A of the first water tank 1 in the fifth embodiment of FIG. 5. Therefore, the seventh embodiment is described with emphasis placed on the differences from the fifth embodiment.

The sludge return pipe 33 is equipped with a pump 35. By operating this pump 35, the microbial sludge 6 that has settled in the second water tank 13 is passed through the sludge return pipe 33 and is sprinkled onto the waste water surface of the upper part 1A of the first water tank 1. The microbial sludge 6 returned to the upper part 1A of the first water tank 1 lends itself to the treatment of organic matters in the water.

In the seventh embodiment, by returning the microbial sludge 6 that has settled in the second water tank 13 to the upper part 1A of the first water tank 1, the microbial concentration in the first water tank 1 is increased. Thus, the organic matters treatment effect is enhanced rationally.

Figure 8:
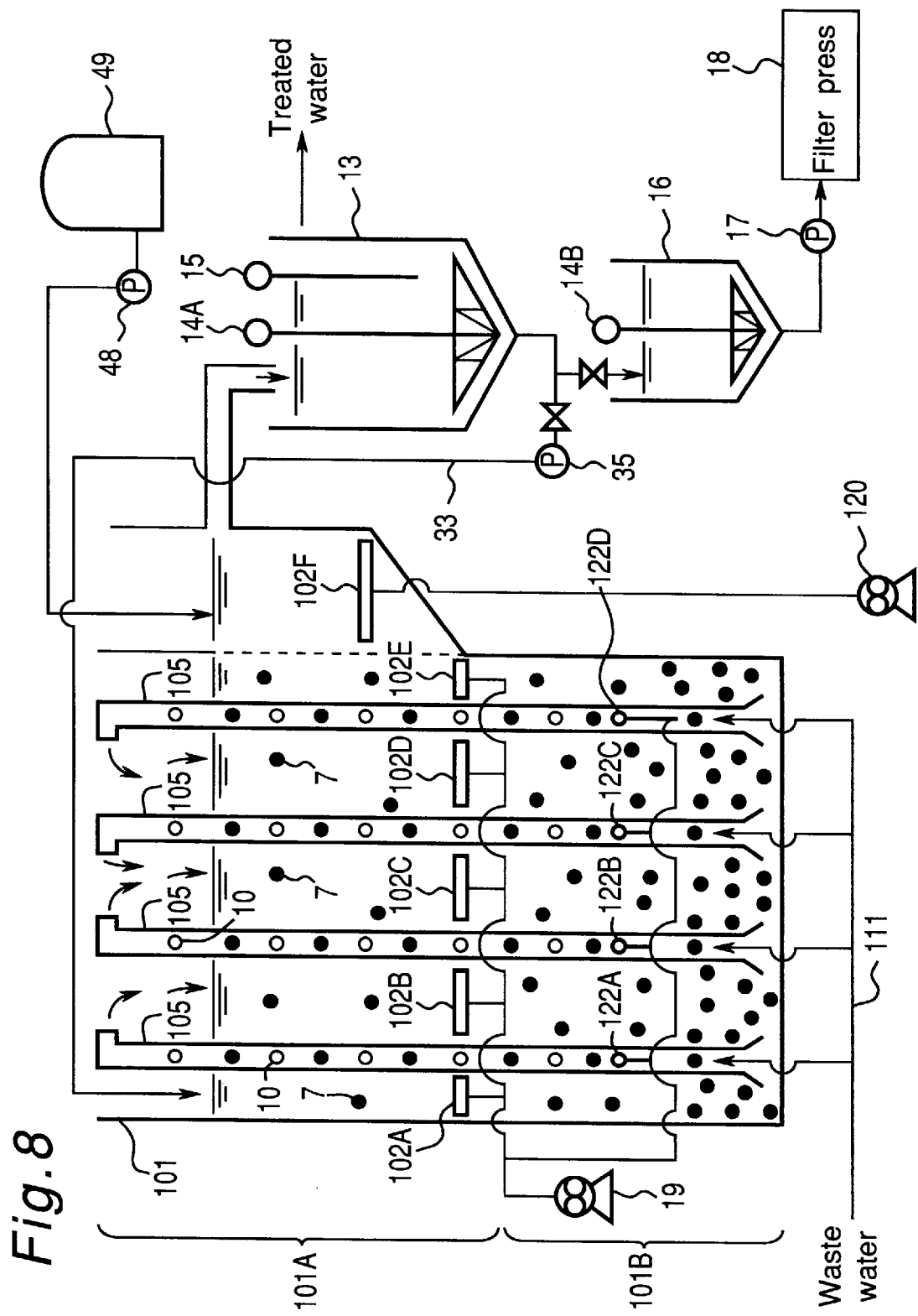
FIG. 8 is a conceptual view of an eighth embodiment of the invention, which is a modification of the second embodiment.

The first water tank 1 of the first, second, third, and fourth embodiments as well as of the fifth, sixth, and seventh embodiments is not limited to the configuration as shown in the drawings, and may be funnel-shaped. Also, the first water tank 1 may be formed into such a shape that the distance between opposite side walls is constant in the depthwise direction, as shown in FIG. 8. In this case, the water tank is easy to fabricate as well as easy to install. However, in this case, the density of reaction filler in the lower part decreases to some extent.

Eighth Embodiment:

The eighth embodiment shown in FIG. 8 differs from the second embodiment shown in FIG. 2 only in that an upper part 101A and a lower part 101B of the FIG. 8 embodiment are different in construction from the upper part 1A and lower part 1B in the second embodiment, and that the eighth embodiment has four air lift pumps 105 instead of the single air lift pump 5 of FIG. 2. Therefore, this embodiment is described with emphasis placed on a first water tank 101. In FIG. 8, the same components as in the second embodiment are designated by the same numerals.

In the first water tank 101, fluorine-containing waste water and the calcium carbonate mineral 7 are strongly agitated and fluidized in the upper part 101A with the air discharged by air diffusers 102A, 102B, 102C, 102D, 102E. In the lower part 101B, on the other hand, there is no fluidization by aeration, so that the calcium carbonate mineral 7 settles down by gravity. Thus, the lower part 101B has a higher density of the calcium carbonate mineral 7 in a lower zone.

Accordingly, in the upper part 101A, the calcium carbonate mineral 7 strongly fluidized removes fluorine in the waste water through chemical reaction. In the lower part 101B, on the other hand, organic matters in the waste water (such as surface active agents and organic solvents) are treated efficiently by microorganisms that have propagated on the calcium carbonate mineral 7 present at high density and under slow fluidization.

This first water tank 101, of which the width of the upper part 101A and the width of the lower part 101B are generally equal to each other as shown in FIG. 8, has an advantage that it is easy to install and besides it can make good use of an installation space, as compared with the water tank 1 of tapered configuration as shown in FIG. 2. The first water tank 101 has a further advantage that it is easier to fabricate, as compared with the water tank of tapered configuration. The first water tank 101 is equipped with four air lift pumps 105, but the number of air lift pumps to be equipped may be increased or decreased depending on the quantity of waste water or the residence time of waste water. However, it is desirable that the air lift pumps 105 are arrayed equidistantly on the bottom surface of the first water tank 101, as shown in FIG. 8, such that the water and the calcium carbonate mineral 7 are circulated uniformly within the tank.

Ninth Embodiment:

FIG. 9 shows a ninth embodiment of the waste water treatment apparatus according to the invention. This ninth embodiment has a chemical reaction fluidization tank 201, a biological reaction/fluidization tank 210, a settling tank 216, and a sludge concentrating tank 219. The ninth embodiment further has a pit 222, a filter press 221, and a filter 224.

The chemical reaction/fluidization tank 201 has an upper part 201A and a lower part 201B. The upper part 201A has a straight portion 201A-1 which is opened upward, and a tapered portion 201A-2 which is continuous with the straight portion 201A-1 and which is tapered downward. The distance between side walls of the straight portion 201A-1 is generally constant. The tapered portion 201A-2 has a tilted wall 233. The lower part 201B is formed into an elongate tubular shape. The distance between side walls of the lower part 201B is about ¼ the distance between side walls of the straight portion 201A-1.

Within the chemical reaction/fluidization tank 201, an air lift pump 205A is placed. This air lift pump 205A extends straight upward from near the bottom of the lower part 201B, passing through the upper part 201A and then bending in a horizontal direction above the straight portion 201A-1. The air lift pump 205A is further bent downward vertically at an end of the horizontally bent portion, extending up to an intermediate portion of the straight portion 201A-1.

An air diffuser 202A for aeration and agitation is placed along the tilted wall 233 of the tapered portion 201A-2 of the upper part 201A. The air diffuser 202A is connected to a first blower 226. An air diffuser 202B is disposed within a lower end portion of the air lift pump 205A. The air diffuser 202B is also connected to the first blower 226.

An inlet 209A for an outflow pipe is formed at a generally vertical center of the side wall of the straight portion 201A-1 of the upper part 201A. A shielding plate 213 is disposed in the inlet 209A. This outflow pipe inlet 209A is linked with the outflow pipe outlet 214A via a valve 215. The outlet 214A communicates with an upper part 210A of the biological reaction/fluidization tank 210.

The biological reaction/fluidization tank 210 has the upper part 210A and a lower part 210B. The upper part 210A has a straight portion 210A-1 and a tapered portion 210A-2 adjoining the lower end of the straight portion 210A-1. The tapered portion 210A-2 is tapered downward, and has a tilted wall 243. The upper part 210A has a separating portion 212 partitioned off by a separating plate 244.

The lower part 210B adjoins the lower end of the tapered portion 210A-2. The lower part 210B is formed into a straight shape having a width as narrow as about ¼ the width of the straight portion 210A-1. An air lift pump 205B is disposed also within the biological reaction/fluidization tank 210. The air lift pump 205B extends straight from the lower part 210B upwardly beyond the upper part 210A, with its upper end bent into a hook shape. The tip of the hook-shaped portion is projected into the straight portion 210A-1 of the upper part 210A by a specified length. An air diffuser 202C for aeration and agitation is disposed along the tilted wall 243 of the upper part 210A. This air diffuser 202C is connected to the first blower 226. An air diffuser 202D disposed in a lower end portion of the air lift pump 205B is also connected to the first blower 226. Further, an air diffuser 228 is disposed below the separating portion 212. This air diffuser 228 is connected to a second blower 227. An outlet pipe extends horizontally from the separated portion 212. An inlet 209B of the outlet pipe is formed in the side wall of the separating portion 212 and in a position slightly above a vertical center of the separating portion 212. The outlet pipe connects to a vertical outlet 214B. This outlet 214B is projected into the settling tank 216 by a specified length downward from above. Within the settling tank 216, a collector 217A and a fluorine concentration meter 218 are placed. A sludge inlet pipe extends from the bottom of the settling tank 216 to the sludge concentrating tank 219. The sludge inlet pipe introduces the sludge settled in the settling tank 216 to the sludge concentrating tank 219. The sludge concentrating tank 219 having a collector 217B outputs the concentrated sludge to the succeeding-stage filter press 221 via the pump 20. Meanwhile, the supernatant as treated water in the settling tank 216 is introduced to the pit 222. Inserted into this pit 222 is a pipe connected with a water supply pump 223, so that treated water pumped up by the pump 223 is introduced to the filter 224. Thus, the treated water that has passed the filter 224 results in final treated water.

The fluorine concentration meter 218 of the settling tank 216 detects the fluorine concentration of the treated water in the settling tank 216, and provides a signal representing the detected fluorine concentration value through a signal line 225 to the first blower 226 via an adjustment meter (not shown). Then, the first blower 226 is controlled in its output through inverter control based on the signal representing the fluorine concentration value.

In the waste water treatment apparatus constructed as described above, fluorine-containing waste water flows into the upper part 201A of the chemical reaction/fluidization tank 201 constituting the first water tank, through an inflow pipe 250. This chemical reaction/fluidization tank 201 has a tilted surface 233 tilted toward the lower part 201B formed into a deep pit.

When the air lift pump 205A is operated, the calcium carbonate mineral 207 gathered in the lower part 201B of the chemical reaction/fluidization tank 201 is transferred to the upper part 201A along with air bubbles 208 by the air lift pump 205A. Then, the calcium carbonate mineral 207, which has a specific gravity of 2.7, gradually descends from the upper part 201A toward the lower part 201B, guided by the tilted surface 233 in the chemical reaction/fluidization tank 201, while being fluidized and agitated by air bubbles 208. The calcium carbonate mineral 207 is then pumped up by the air lift pump 205A, and ascends from the lower part 201B to the upper part 201A along with air bubbles 208. In this way, the calcium carbonate mineral 207 is fluidized and circulated over and over again in the chemical reaction/fluidization tank 201.

In this connection, when calcium carbonate mineral particles having a particle size of 1 mm or less are selected as the calcium carbonate mineral 207, the calcium carbonate mineral 207 particles will not settle down soon, but can be normally maintained in the fluidized state by aeration. In other words, the balanced relation between descent of the calcium carbonate mineral due to its specific gravity and ascent thereof due to aeration is maintained. The upper part 201A of the chemical reaction/fluidization tank 201 includes fluidized bed 206A of calcium carbonate formed over a wide range. In this embodiment, the particle size of the calcium carbonate mineral 207 was set to 0.5 mm on average.

Figure 9A:
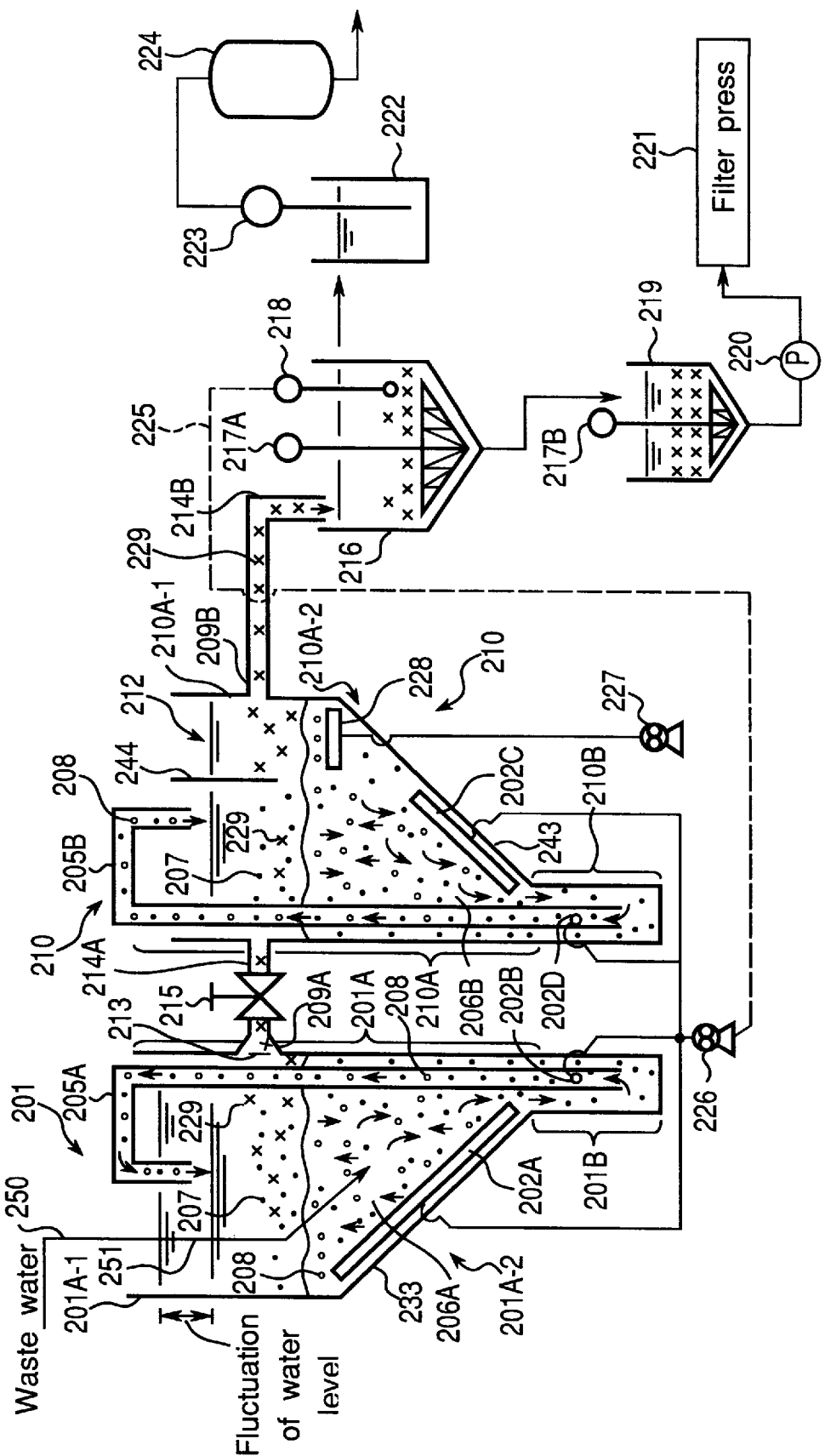
FIG. 9A is a conceptual view of a modification of the ninth embodiment of FIG. 9.

For the treatment of high-concentration fluorine-containing waste water, an inflow pipe 251 extending to the fluidization bed 206A may be installed as shown in FIG. 9A so that the fluorine-containing waste water is introduced directly to the fluidization bed 206A that is far higher in concentration of the calcium carbonate mineral 207.

The residence time of treated water in the chemical reaction/fluidization tank 201 was set to four hours with the safety coefficient included, based on the fact that the fluorine concentration of the inflow waste water is around 30 to 300 ppm.

The reference quantity of aeration air derived from the air diffuser 202A in the chemical reaction/fluidization tank 201 was set to 100 m$^3$ per day on the basis of a 1 m$^3$ tank volume.

The calcium carbonate mineral 207 having a mean particle size of 0.5 mm is packed in the chemical reaction/fluidization tank 201 at a ratio of 10% to 40% of the tank volume. The packing amount of the calcium carbonate mineral. 207 is not particularly limited, but too small a packing amount would make it necessary to resupply the calcium carbonate mineral 207 in a short time. Larger amounts of packed calcium carbonate mineral 207 makes it unnecessary to resupply it for a long time. When secure reaction of calcium carbonate mineral with fluorine is desired, or when wide fluctuations of fluorine concentration in the inflow water are involved, large amounts of the calcium carbonate mineral 207 should be packed. In the upper part 201A of the chemical reaction/fluidization tank 201, the state that the calcium carbonate mineral 207 is kept being flown up, low as its concentration is, can be ensured by the aeration effected by the air discharged from the air diffuser 202A and by the circulation of the calcium carbonate mineral 207 effected by the air lift pump 205A.

In comparison between the upper part 201A and the lower part 201B of the chemical reaction/fluidization tank 201, the lower part 201B is far higher in concentration of the calcium carbonate mineral 207, and also the lower part 201B is fluidized more slowly than the upper part 201A.

As already described, the inflow pipe 251, if provided in the calcium carbonate mineral fluidization layer 206A, makes the reaction efficiency increased, so that the residence time can be reduced. However, in the absence of the inflow pipe 251, setting of a sufficient residence time in the upper part 201A makes it possible to treat fluorine without causing any problems.

Since the fluidized bed 206A of the calcium carbonate mineral 207 is provided in the chemical reaction/fluidization tank 201, there can be provided a process in which waste water (treated water) is moved and agitated by the calcium carbonate mineral 207. Accordingly, in this fluidization tank 201, the reaction of fluorine in the fluorine waste water with calcium progresses more reliably and faster than in the case where the calcium carbonate mineral 207 is immobilized. If the inflow amount of fluorine waste water varies in the chemical reaction/fluidization tank 201, the flow rate to the biological reaction/fluidization tank 210 is stabilized by adjusting the valve 215. When the flow rate of fluorine waste water to the chemical reaction/fluidization tank 201 has increased, the water level of the chemical reaction/fluidization tank 201 is elevated to prevent the flow rate to the biological reaction/fluidization tank 210 from fluctuating. Accordingly, the fluctuation in flow rate of waste water to the chemical reaction/fluidization tank 201 will almost never affect the treatment effect of the biological reaction/fluidization tank 210.

Then, water under treatment, of which fluorine has been treated in the chemical reaction/fluidization tank 201, leaves the calcium carbonate mineral 207 in the chemical reaction/fluidization tank 201 when passing through the shielding plate 213. Calcium fluoride 229, whose specific gravity is smaller than that of the calcium carbonate mineral 207, and the water pass the outflow pipe inlet 209A, valve 215, and outflow pipe outlet 214A, and enter the biological reaction/fluidization tank 210. However, with the flow rate raised, there is a possibility that even the calcium carbonate mineral 207 having a larger specific gravity is sucked into the biological reaction/fluidization tank 210.

The flow rate adjustment by the valve 215 contributes to the separation between the calcium carbonate mineral 207 and "calcium fluoride 229 and biological membrane sludge" in the separated portion 212 of the biological reaction/fluidization tank 210.

The calcium carbonate mineral 207 is packed in the biological reaction/fluidization tank 210. The objectives of this biological reaction/fluidization tank 210 are the second-stage high-level treatment of fluorine in the water and the treatment of organic matters typified by surface active agents in the water. The high-level treatment of fluorine herein refers to a high-level treatment through the use of microorganisms of the fluorine in the water in which the fluorine concentration has become below 15 ppm in the chemical reaction/fluidization tank 201. In this biological reaction/fluidization tank 210, fluorine in the water is treated by concentrating and accumulating low-concentration fluorine in the bodies of microorganisms. Moreover, the fluorine is treated by making use of the flocculation property of microbial sludge.

The calcium carbonate mineral 207, which reacts with fluorine under acidic conditions, in turn becomes an immobilizing carrier for microorganisms when the pH of the water is improved to neutrality. Particularly, the calcium carbonate mineral 207 with particle size of lower than 1 mm will easily make a carrier for immobilizing microorganisms. For culture of microorganisms in the biological reaction/fluidization tank 210, principally organic matters in the fluorine-containing waste water are utilized as the substrate for microorganisms. Microorganisms cultured at other places can be added. When the test run adjustment is required to be hurried, or when organic matters in the fluorine-containing waste water is insufficient, microorganisms may be added from the beginning, so that microorganisms can relatively easily be immobilized to the calcium carbonate mineral 207. Also, if a longer time is taken, microorganisms included in the air discharged from the first blower. 226 can be propagated naturally in the tank 210.

Since both the water tank 201 and the water tank 210 contain the calcium carbonate mineral 207 particles of 1 mm or less particle size, they seemingly resemble each other. However, the water tank 210, in which microorganisms are added and cultured, is a biological reaction/fluidization tank. If the waste water treatment apparatus continues being operated for a long period of time in the presence of organic matters in the water with the water tank 210 illuminated by solar light or fluorescent light, then algae will be generated and propagated on the surface of the calcium carbonate mineral 207, resulting in discoloration from white to green. These generated and propagated algae are effective for the treatment of organic matters. Spontaneous generation of algae on the surface of the calcium carbonate mineral 207 can contribute to the cleaning of breeding water for freshwater fish. In any case, the calcium carbonate mineral 207 is a natural product having irregular surfaces, so that it will easily make an immobilizing carrier for microorganisms.

Due to the recent trend of the progress of ICs toward further micro-structure, there is a tendency that surface active agents are mixed into chemicals used in semiconductor factories. As a result, organic-matters typically represented by surface active agents in the fluorine-containing waste water are increasing more and more. Therefore, it is of growing necessity to treat the fluorine and organic matters in the treated water.

The biological reaction/fluidization tank 210 has a construction mostly similar to that of the chemical reaction/ fluidization tank 201, but differs from the tank 201 in that the former has the calcium carbonate mineral separating portion 212. Also, the residence time for the water in the biological reaction/fluidization tank 210 was set to 3 hours, a period slightly shorter than in the chemical reaction/fluidization tank 201. A standard aeration air quantity for the biological reaction/fluidization tank 210 was set to 60 m³ per day on the basis of a tank volume of 1 m³.

The biological reaction/fluidization tank 210 also has an air diffuser 202C and an air lift pump 205B, but differs from the chemical reaction/fluidization tank 201 in that the tank 210 has the separating portion 212 for separating the calcium carbonate mineral 207 from products of reaction and the like. The separating portion 212 has a separation air diffuser 228 as an aeration means. This separation air diffuser 228 executes a light aeration, thereby causing calcium fluoride 229, a product of reaction, to be flowed out from the separating portion 212 while causing the calcium carbonate mineral 207 to settle down. Thus, the calcium carbonate mineral 207 and the calcium fluoride 229 are separated from each other. This separation takes advantage of the fact that the specific gravity of the calcium carbonate mineral 207 is greater than the specific gravity of the calcium fluoride 229. The settling time in the separating portion 212 was set to 30 minutes.

The water containing calcium fluoride 229 and biological membrane sludge, which has flowed out from the biological reaction/fluidization tank 210, flows into the settling tank 216, which is a third water tank. The settling time in the settling tank 216 was set to 3 hours. In the settling tank 216, calcium fluoride 229 and biological membrane sludge, settle down, and are collected up by the collector 217A and separated from the supernatant. Since the settling time in the settling tank 216 is longer than in the separating portion 212, the calcium fluoride 229 and biological membrane sludge, which have not settled down in the separating portion 212, will settle down in the settling tank 216. These settled calcium fluoride 229 and biological sludge flow into the sludge concentrating tank 219. Mixed sludge of calcium fluoride and biological membrane sludge has poor dehydratability as compared with conventional sludge generated with the use of slaked lime. Therefore, the mixed sludge is introduced by the sludge pump 220 into the filter press 221 having a good dehydrating performance, and is dehydrated there.

Meanwhile, upon increase of the fluorine concentration in the water in the settling tank 216 in excess of the set value, the fluorine concentration meter 218 installed in the interior of the settling tank 216 produces a signal representing the increase of the fluorine concentration, and outputs the signal to the signal line 225 via an adjustment meter (not shown). Then, the quantity of air discharged by the first blower 226 is increased through inverter control, so that the agitation due to the aeration in the chemical reaction/fluidization tank 201 and in the biological reaction/fluidization tank 210 is intensified, and at the same time, the in-tank circulation by the air lift pumps 205A and 205B is strengthened. As a result, with the strong aeration and the strong circulation, the reaction between fluorine and calcium into calcium fluoride 229 progresses rapidly, so that the fluorine concentration of the water in the settling tank 216 is lowered as time elapses.

Next, the water containing a few suspended solids flows from the settling tank 216 into the pit 222 and is then transferred to the filter 224 by the water supply pump 223, where the transferred water is filtered. By passing through this filter 224, water treated in terms of pH, fluorine, organic matters, and suspended solids is obtained.

Referring to chemical reaction/fluidization tank 201 again, microorganisms propagate themselves on the surface of the calcium carbonate mineral 207 in the lower part 210B of the chemical reaction/fluidization tank 201 as well. Therefore, the treatment of organic matters by these microorganisms is possible. However, the ratio of the depth of the lower part 201B to the total depth of the water tank 201 in this ninth embodiment is smaller than the ratio of the depth of the lower part 1B to the total depth of the water tank 1 in the first embodiment. Because of the smaller depth of the lower part 201B, the water tank 201 of the ninth embodiment is lower in the microbial treatment ability, as compared with the water tank 1 of the first embodiment. In this regard, in order to avoid lack of the microbial treatment ability, two water tanks 201 and 210 are provided, and the chemical reaction treatment rather than the microbial treatment is performed preferentially in the water tank 201, while the microbial treatment rather than the chemical reaction is performed preferentially in the water tank 210.

This embodiment has an advantage that the water tanks 201 and 210 are easier to fabricate than the water tank 1 because of their shallowed lower parts 201B and 201B.

Experimental Example:

Next described is an actual experimental example. A waste water treatment apparatus having the same construction as that of the fluorine-containing waste water treatment apparatus as shown in FIG. 9 was built. In this treatment apparatus, the volume of the chemical reaction/fluidization tank 201 was set to about 0.6 m³, the volume of the biological reaction/fluidization tank 210 was set to about 0.5 m³, the volume of the settling tank 216 was set to about 0.4 m³, and the volume of the filter 224 was set to about 0.1 m³. Then, a fluorine treatment experiment was carried out.

In this case, as a result of treating the waste water containing fluorine and surface active agents with pH 2.2, fluorine concentration 122 ppm, and COD 25 ppm prior to treatment, the pH became 7.2, the fluorine concentration became 5.6 ppm, and the COD became 3.6 ppm after the treatment. Moreover, the volume of sludge generated was reduced to about 40% or less of the conventional counterpart.

Figure 10:
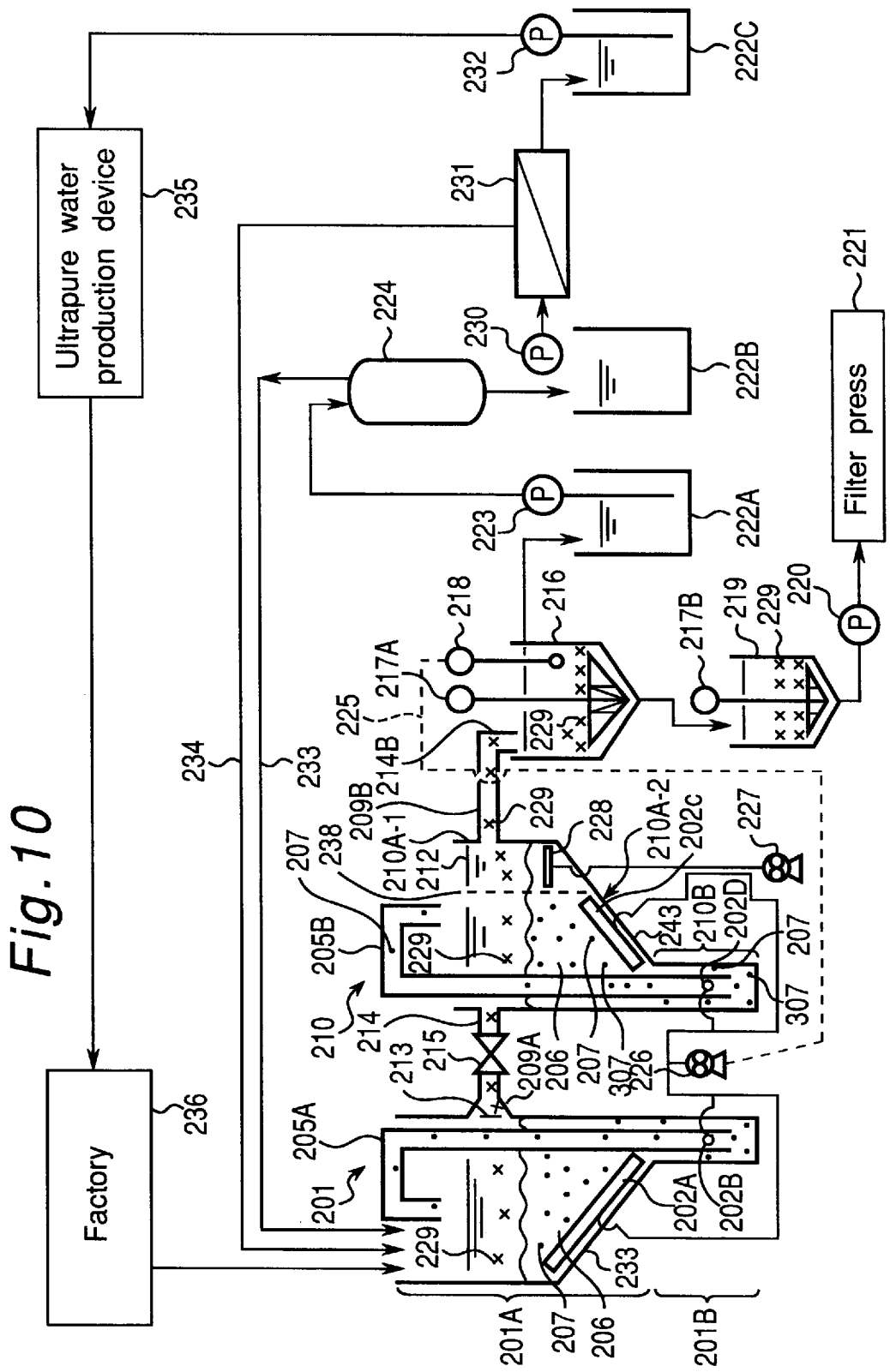
FIG. 10 is a conceptual view of a tenth embodiment of the invention.
Figure 13:
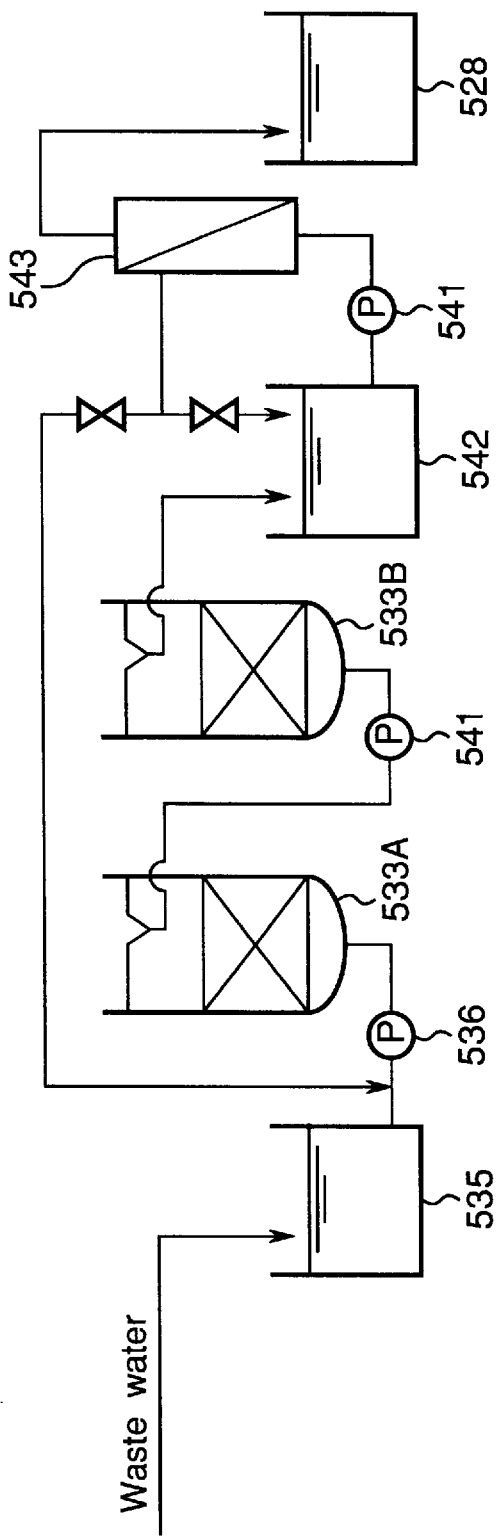
FIG. 13 is a conceptual view of a prior art fluorine-containing waste water treatment apparatus.
Figure 14:
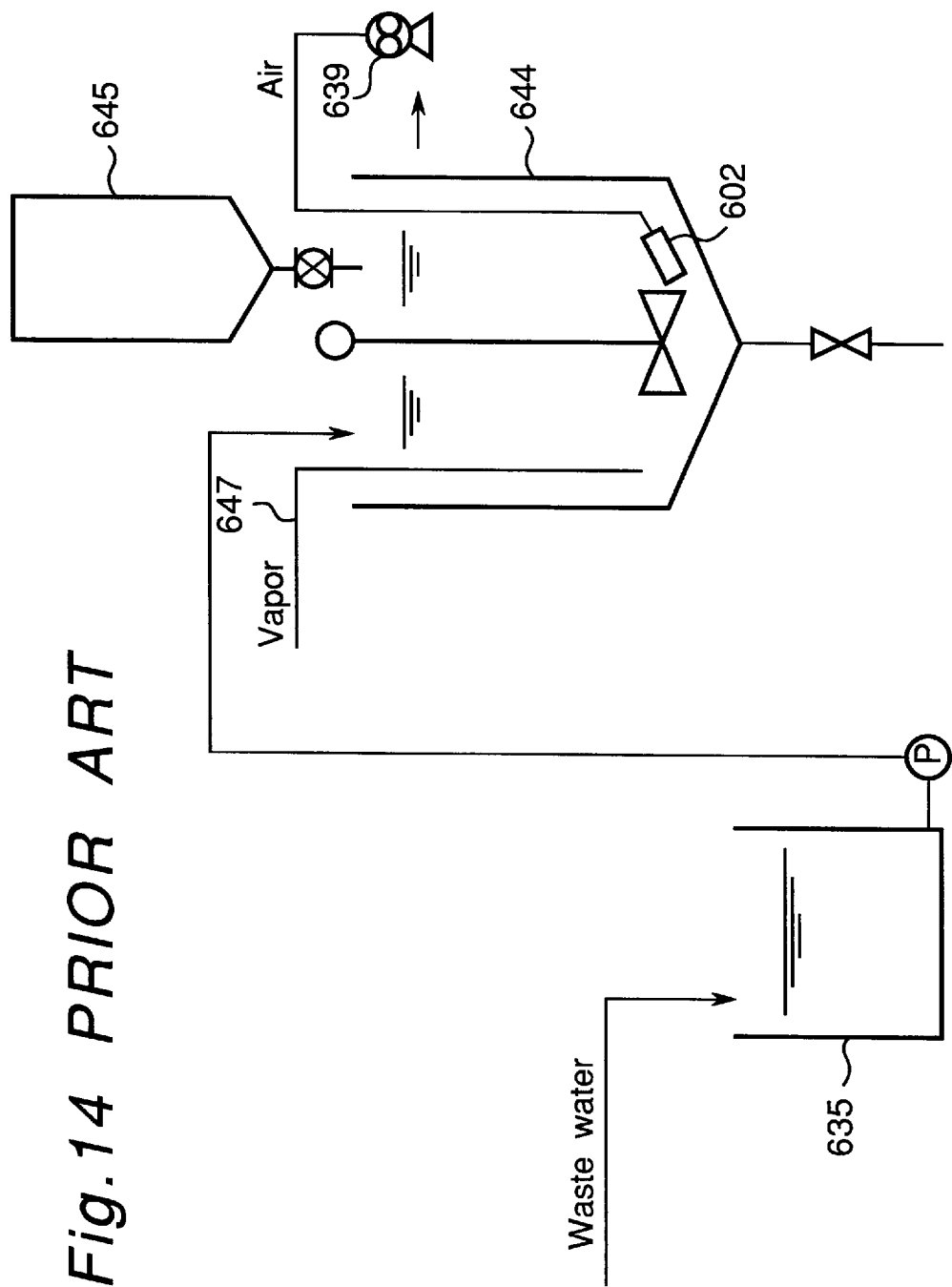
FIG. 14 is a conceptual view of another prior art example.
Figure 15:
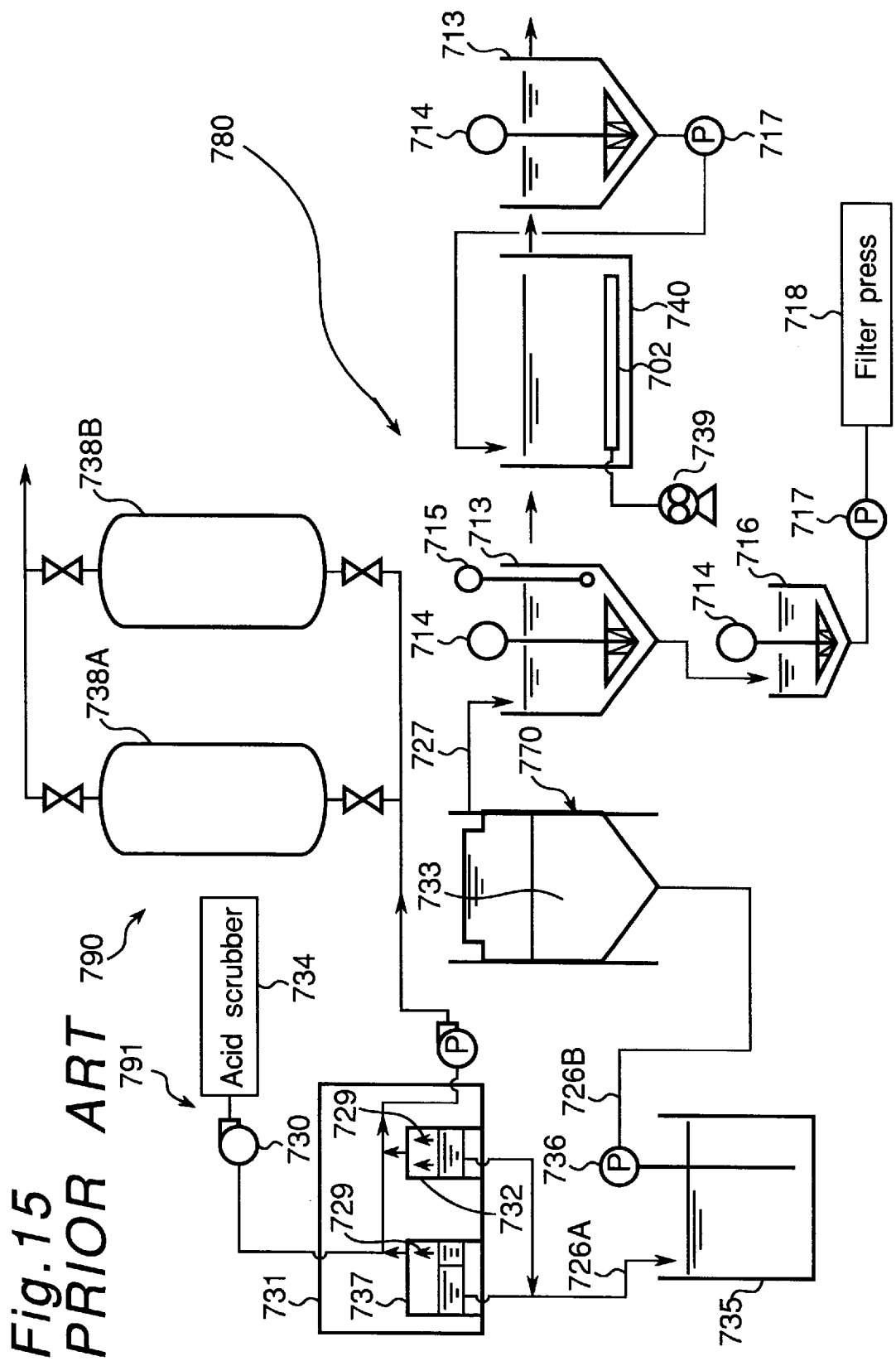
FIG. 15 is a conceptual view of a prior art waste water treatment system and waste gas treatment system.
Figure 16:
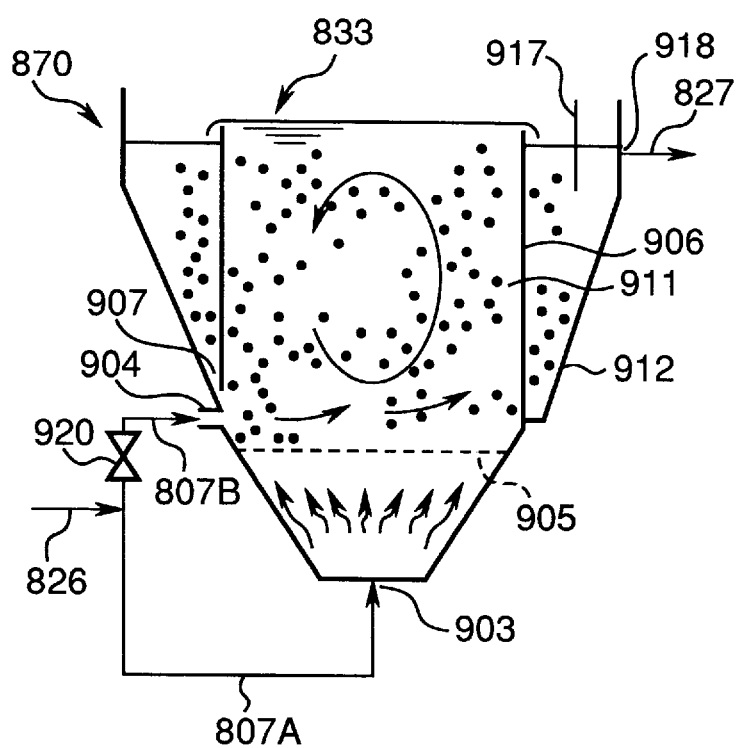
FIG. 16 is a conceptual view of a prior art hydrogen peroxide removal unit.
Figure 17:
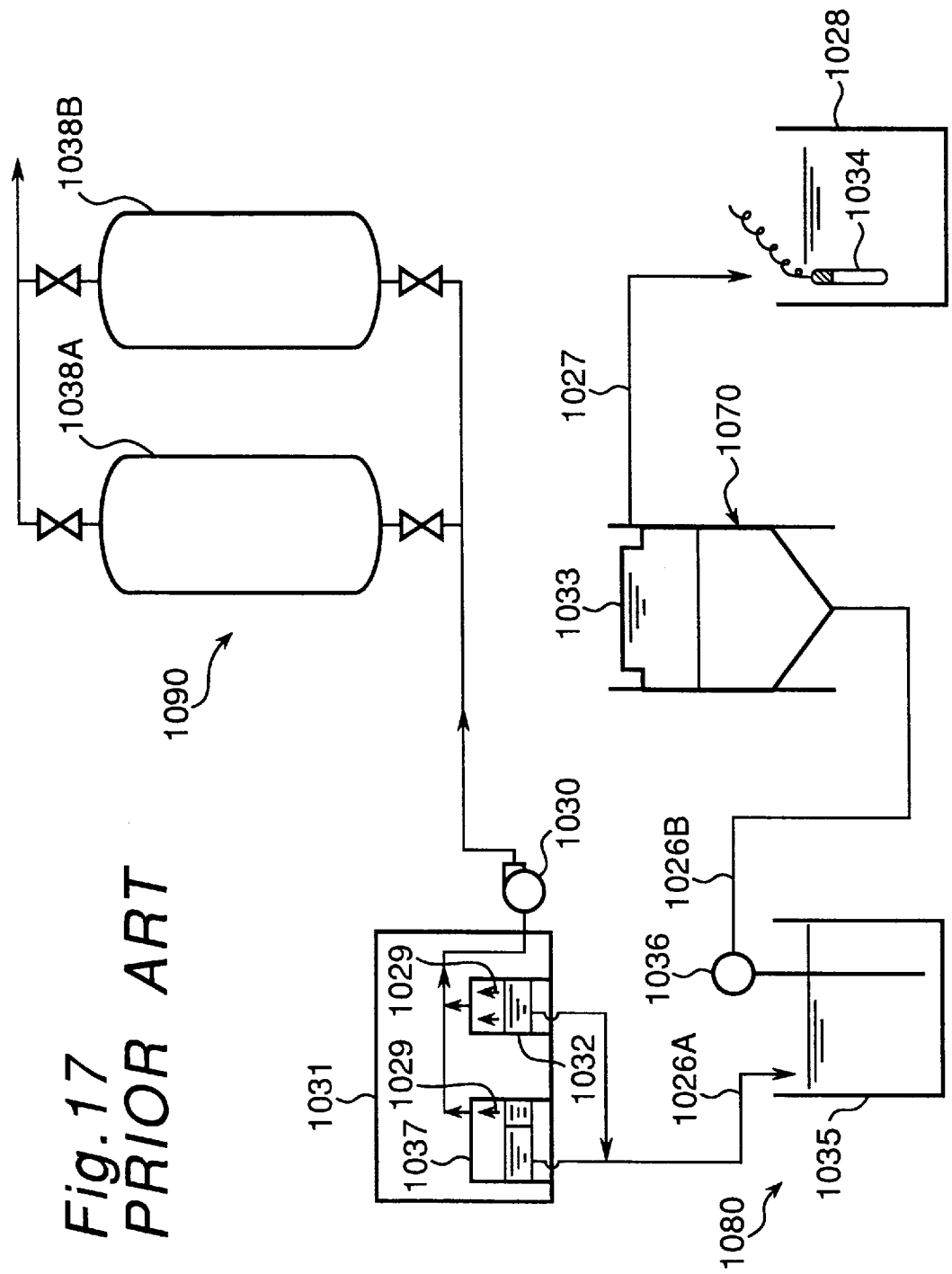
FIG. 17 is a conceptual view of another prior art example of the waste water treatment system and waste gas treatment system.

Tenth Embodiment:

Next, FIG. 10 shows a tenth embodiment of the present invention. This tenth embodiment differs from the ninth embodiment shown in FIG. 9 only in the following points (1), (2), and (3). That is, (1) in the tenth embodiment, not only calcium carbonate mineral 207 but also activated carbon 307 is packed in the biological reaction/fluidization tank 210. (2) The tenth embodiment has a pit 222B, a reverse osmosis membrane 231, and a pit 222C at the stage succeeding the filter 224, as well as an ultrapure water production device 235 at the stage succeeding the pit 222C. (3) The tenth embodiment has further comprises a return pipe 233 for returning treated water from the filter 224 to the upper part 201A of the biological reaction/fluidization tank 201, and a return pipe 234 for returning treated water from the reverse osmosis membrane 231 to the upper part 201A of the fluidization tank 201. Below, the tenth embodiment is described with emphasis placed on the differences from the ninth embodiment, and in FIG. 10, the like components as in the ninth embodiment are designated by the same numerals.

The tenth embodiment system is able to treat waste water containing hydrofluoric acid, hydrogen peroxide, and surface active agents. The chemical reaction/fluidization tank 201 is packed with the calcium carbonate mineral 207 whose particle size is 1 mm or less. The biological reaction/ fluidization tank 210 is packed with the calcium carbonate mineral 207 with particle size of not more than 1 mm and the activated carbon 307 with particle size of not less than 3 mm. In the settling tank 216, a measuring instrument 218 including a fluorine concentration meter and an oxidation-reduction potential meter is installed. The biological reaction/fluidization tank 210 also has a screen 238 constituting the inlet of the separating portion 212. The screen 238 is formed of a net with a 2 mm mesh.

In this waste water treatment system, since fluorine-containing waste water is reacted directly with the calcium carbonate mineral 207 that is being fluidized, an effective agitation reaction process is included. Thus, the reaction progresses fast, so that the reaction time of fluorine ions in the waste water and calcium is reduced. Through the fast reaction, calcium fluoride 229 is generated, and the calcium fluoride 229 is separated as a settling from the supernatant in the settling tank 216. Thus, fluorine can be removed from the waste water promptly.

If the fluorine-containing waste water is introduced directly to the calcium carbonate mineral fluidized bed 206 in which an excessive amount of calcium is present, the reaction is allowed to progress more promptly and more reliably. As a result, the treatment ability can be stabilized regardless of any change in the fluorine concentration in the waste water.

Generally, when fluorine-containing waste water with pH of as low as 2 to 3 is introduced to the chemical reaction/fluidization tank 201, calcium will easily elute from the calcium carbonate mineral 207 particles of not more than 1 mm particle size that are normally kept in a fluidized and circulated state. As a result, calcium fluoride 229 is promptly generated through chemical reaction. Thus, the pH of the treated water is improved and approaches the neutrality. Then, also in the biological reaction/fluidization tank 210, the calcium carbonate mineral 207 of not more than 1 mm particle size is normally kept in a fluidized and circulated state by the aeration function of the air diffuser 202C and the transfer and circulation function of the air lift pump 205B. In this biological reaction/fluidization tank 210, the calcium carbonate mineral 207 serves as an immobilizing carrier for microorganisms so that the organic matters in the treated water, typified principally by surface active agents, can be biologically treated by the reaction of microorganisms that have propagated on the surface of the calcium carbonate mineral 207. In addition, the calcium carbonate mineral 207 of not more than 1 mm particle size is fluidized by aeration. Therefore, the calcium carbonate mineral 207 will not be flocculated even in a long-term operation.

In the separating portion 212 of the biological reaction/fluidization tank 210, unreacted calcium carbonate mineral 207, the specific gravity of which is as heavy as 2.7, will settle down, while the calcium fluoride 229 and peeled microbial sludge with specific gravity below 2 will be flowed out into the settling tank 216. Then, in the settling tank 216, the calcium fluoride 229 and microbial sludge are settled and separated from supernatant in a sufficient settling time. Fine suspended solids in the supernatant in this settling tank 216 can be securely removed by the subsequent filtration process.

The filtered water is further treated by the reverse osmosis membrane 231, by which various types of ions, soluble organic matters, fine particles, microorganisms, and the like that have been contained in the water are removed securely. Thus, treated water usable in the ultrapure water production device 235 can be obtained. The concentrated water containing ions including principally calcium ions and sulfuric acid ions, and organic matters concentrated by the reverse osmosis membrane 231, is returned to the chemical reaction/fluidization tank 201 through the return pipe 234. These returned calcium ions lend themselves to the reaction with fluorine. The returned organic matters are biologically treated in the biological reaction/fluidization tank 210.

The measuring instrument 218 including a fluorine concentration meter and a hydrogen peroxide concentration meter and provided in the settling tank 216 measures the fluorine concentration and the hydrogen peroxide concentration of the treated water in the settling tank 216, and outputs a signal representing the measured values to the signal line 225 via an adjustment meter (not shown). Based on this signal, the first blower 226 is inverter-controlled. Through this control, the fluidized state of the calcium carbonate mineral 207 in the water tanks 201 and 210 is varied. That is, when the fluorine concentration and the hydrogen peroxide concentration are low, the quantity of air discharged by the first blower 226 is decreased. Conversely, when the fluorine concentration and the hydrogen peroxide concentration are high, the quantity of air discharged by the first blower 226 is increased. Through this control, the treatment ability of the water tank 210 and the water tank 210 is increased or decreased such that the fluorine concentration and the hydrogen peroxide concentration in the settling tank 216 do not exceed their respective set values. More specifically, in normal operation, the water tank 201 serves as a chemical reaction fluidization tank, while the water tank 210 serves as a biological reaction/fluidization tank. However, when the fluorine concentration and/or hydrogen peroxide concentration of the influent to the settling tank 216 has abruptly increased, the first blower 226 is controlled by inverter such that the quantity of aeration air is abruptly increased. Therefore, the biological membranes on the surfaces of the calcium carbonate mineral 207 and the surfaces of the activated carbon 307 in the water tank 210 are peeled off. Consequently, the water tank 210 becomes a chemical reaction fluidization tank and treats fluorine and hydrogen peroxide through the chemical reaction. In more detail, when the fluorine concentration and/or hydrogen peroxide concentration of the settling tank 216 exceeds the set values, the quantity of air discharged by the first blower 226 is increased up to two to four times the normal by inverter control. Accordingly, the quantities of air discharged by the air diffusers 202A, 202C and the air lift pumps 205A, 205B increase up to two to four times the normal. As a result, all of the upper part 201A, the lower part 201B, the upper part 210A, and the lower part 210B change into chemical reaction fluidization tanks, so that their ability of treating fluorine and hydrogen peroxide is doubled. In other words, the calcium carbonate mineral 207 of the upper parts 201A, 210A, as well as the calcium carbonate mineral 207 of the lower parts 201B, 210B are subjected to further contact, mixing, and circulation than before, so that there is created a complete mixing system in which the excessive calcium carbonate mineral in the whole tanks 201 and 210 is utilized for the reaction with fluorine. Therefore, the efficiency of reaction with fluorine is enhanced and the reaction is sped up, so that the increased fluorine concentration can be securely lowered. Thus, according to this embodiment, even if the reaction tank volume is smaller than conventional, the removal of fluorine is done successfully. The calcium fluoride 229, a product of reaction between calcium carbonate mineral 207 and fluorine, that is lower in specific gravity than the calcium carbonate mineral 207 is pushed out from the water tank 201 into the water tank 210 gradually through the outflow pipe and the valve 215 through the aeration cleaning by the first blower 226. The calcium fluoride 229 is further pushed out from the water tank 210 to the water tank 216 by the aeration cleaning in the water tank 210. Meanwhile, the biological membrane sludge generated in the water tank 210, which is also lower in specific gravity than the calcium carbonate mineral 207, is also pushed out from the water tank 210 to the water tank 216 by aeration.

Also, as to hydrogen peroxide, when its concentration in the settling tank 216 has increased, the first blower 226 comes into a stronger aeration state, so that the biological membranes on the activated carbon 307 packed in the water tank 210 are peeled off. As a result, the activated carbon 307 present in the water tank 210 serves as a catalyst in decomposing hydrogen peroxide, instead of treating organic matter.

According to this embodiment, the water tank 210 includes the separating portion 212 having the air diffuser 228. In this separating portion 212, the calcium carbonate mineral 207 settles down along the wall 243, while the calcium fluoride 229 and the biological membrane sludge are flowed out into the settling tank 216 through the pipe 209B, due to the specific gravity difference between these substances. Then, owing to a large difference between the settling time in the separating portion 212 of the water tank 210 and the settling time in the settling tank 216, the calcium fluoride 229 and the biological membrane sludge flowed out from the separating portion 212 settle down securely in the settling tank 216.

As shown above, according to the tenth embodiment, not only fluorine but also hydrogen peroxide in the waste water can be removed. Thus, the waste water treatment system is able to treat waste water generated as a result of executing the new cleaning method for semiconductors in which fluorine, hydrogen peroxide, and surface active agents are used in the cleaning process.

Also according to the tenth embodiment, since the pH of the water is close to neutrality in the second water tank 210, the activated carbon in the second tank 210 is more efficient in decomposing hydrogen peroxide, as compared with a case wherein activated carbon is packed in the first water tank 201.

Although granular activated carbon is used as reaction filler in the fifth, sixth, seventh, and tenth embodiments, fibrous activated carbon can also be used. Furthermore, activated carbon may be substituted by charcoal having a specific gravity of larger than 1.0.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treatment method comprising the steps of:
   mixing said waste water with a reaction filler through at least a first aerobic fluidization zone and a second aerobic fluidization zone wherein said reaction filler is more strongly fluidized in said first zone as compared to said second zone; and said waste water is chemically treated in said first zone and biochemically treated by aerobic microbial degradation in said second zone; said first aerobic fluidization zone being fluidized in an amount sufficient to separate said reaction filler from any microorganisms contained on said reaction filler.

2. The method of claim 1 wherein either
   i) said waste water contains fluorine and said reaction filler is calcium carbonate; or
   ii) said waste water contains hydrogen peroxide and said reaction filler is activated carbon.

3. The method of 2 further comprising either
   i) measuring fluorine concentration in said second zone when said waste water contains fluorine, and optionally increasing the amount of fluidization in said first zone if said fluorine concentration is greater than a set point; or
   ii) measuring oxidation-reduction potential in said second zone when said waste water contains hydrogen peroxide, and optionally increasing the amount of fluidization in said first zone if said oxidation-reduction potential is greater than a set point.

* * * * *